US012795263B2

(12) United States Patent
Johansson

(10) Patent No.: US 12,795,263 B2
(45) Date of Patent: Nov. 10, 2026

(54) IMAGE SENSOR ASSEMBLY WITH CONVERTER CIRCUIT FOR TEMPORAL NOISE REDUCTION

(71) Applicant: Sony Semiconductor Solutions Corporation, Kanagawa (JP)

(72) Inventor: Erik Robert Johansson, Stuttgart (DE)

(73) Assignee: Sony Semiconductor Solutions Corporation, Kanagawa (JP)

(*) Notice: Subject to any disclaimer, the term of this patent is extended or adjusted under 35 U.S.C. 154(b) by 45 days.

(21) Appl. No.: 18/849,546

(22) PCT Filed: Mar. 14, 2023

(86) PCT No.: PCT/EP2023/056480
§ 371 (c)(1),
(2) Date: Sep. 23, 2024

(87) PCT Pub. No.: WO2023/186527
PCT Pub. Date: Oct. 5, 2023

(65) Prior Publication Data

US 2025/0203245 A1 Jun. 19, 2025

(30) Foreign Application Priority Data

Mar. 31, 2022 (EP) .................................... 22165869

(51) Int. Cl.
*H04N 25/78* (2023.01)
*H04N 25/616* (2023.01)
*H04N 25/618* (2023.01)

(52) U.S. Cl.
CPC ........... *H04N 25/78* (2023.01); *H04N 25/616* (2023.01); *H04N 25/618* (2023.01)

(58) Field of Classification Search
CPC .... H04N 25/78; H04N 25/616; H04N 25/618; H04N 25/76
See application file for complete search history.

(56) References Cited

U.S. PATENT DOCUMENTS 8,553,112 B2 * 10/2013 Kawahito ........... H03M 1/1245 348/241
2002/0051067 A1 * 5/2002 Henderson ........... H04N 25/616 348/241

(Continued)

FOREIGN PATENT DOCUMENTS

CN 101064787 B 8/2010
CN 111464765 A 7/2020
EP 2048785 A1 4/2009

OTHER PUBLICATIONS

International Search Report and Written Opinion mailed on May 11, 2023, received for PCT Application PCT/EP2023/056480, filed on Mar. 14, 2023, 12 pages.

(Continued)

*Primary Examiner* — Twyler L Haskins
*Assistant Examiner* — John H Morehead, III
(74) *Attorney, Agent, or Firm* — XSENSUS LLP

(57) ABSTRACT

An image sensor assembly includes a pixel circuit and a converter circuit. The pixel circuit includes a first amplification transistor and a first selection transistor, wherein the first amplification transistor and the first selection transistor are electrically connected in series. The first amplification transistor and the first selection transistor output first pixel signals at a first pixel output, when the first selection transistor is turned on. The converter circuit receives the first pixel signals from the first selection transistor. The converter circuit further receives second pixel signals from the first selection transistor or from a second selection transistor. The converter circuit converts voltage differences between the first pixel signals and the second pixel signals into digital coefficients (DR, DQ, d0, . . . , dn).

19 Claims, 16 Drawing Sheets

(56) References Cited

U.S. PATENT DOCUMENTS

| | | | | |
|---|---|---|---|---|
| 2009/0251579 | A1* | 10/2009 | Schrey | H04N 25/616 348/308 |
| 2010/0091160 | A1* | 4/2010 | Murakami | H04N 25/627 348/301 |
| 2011/0068967 | A1* | 3/2011 | Mashiyama | H03M 3/04 341/164 |
| 2011/0316635 | A1* | 12/2011 | Kobayashi | H03F 1/32 330/296 |
| 2014/0239154 | A1 | 8/2014 | Chen et al. | |
| 2016/0190187 | A1* | 6/2016 | Nishimura | H04N 25/616 257/292 |
| 2019/0221600 | A1 | 7/2019 | Oh et al. | |
| 2020/0106975 | A1 | 4/2020 | Oike et al. | |
| 2020/0244913 | A1* | 7/2020 | Jung | H04N 25/59 |
| 2021/0337156 | A1 | 10/2021 | Okamoto et al. | |

OTHER PUBLICATIONS

Tomioka et al., "Improved Correlated Multiple Sampling by Using Interleaved Pixel Source Follower for High-Resolution and High-Framerate CMOS Image Sensor", IEEE Transactions on Electron Devices, vol. 68, No. 5, May 2021, pp. 2326-2334.

* cited by examiner

IMAGE SENSOR ASSEMBLY WITH CONVERTER CIRCUIT FOR TEMPORAL NOISE REDUCTION

CROSS-REFERENCE TO RELATED APPLICATIONS

The present application is based on PCT/EP2023/056480, filed Mar. 14, 2023, which claims priority from European Patent Application No. 22165869.3, filed Mar. 31, 2022, the entire contents of each are incorporated herein by reference.

FIELD OF THE INVENTION

The present disclosure relates to an image sensor assembly of a solid-state imaging device. More particularly, the present disclosure relates to an image sensor assembly including a converter circuit comparing pixels signals for temporal noise reduction.

BACKGROUND

Image sensors in solid-state imaging devices include photoelectric conversion devices generating a photocurrent in proportion to the received radiation intensity. A pixel circuit transforms the small photocurrent generated by the photoelectric conversion device into a voltage signal (pixel signal). A source follower circuit outputs the pixel signal on a data line (vertical signal line). A downstream ADC (analog-to-digital converter) converts the analog pixel signal into a digital pixel value. The ADC may be a ramp compare ADC that includes a ramp generator circuit, a comparator circuit and a counter. The comparator circuit compares the pixel signal with a voltage ramp generated by the ramp generator circuit and outputs an active comparator signal when the voltage ramp exceeds or falls below the pixel signal. The counter counts events that occur at regular intervals in a counting period between the start of the voltage ramp and the start of the active comparator signal. The count value at the end of the counting period gives the result of the analog-to-digital conversion and defines the digital pixel value.

Solid-state imaging devices suffer from noise that deteriorates image quality in particular under low light conditions. In order to improve image quality, a readout of each pixel circuit typically includes two periods: In a first period (data phase, D phase), a first pixel signal (data signal) is read out directly after illumination of the pixel and converted into a digital pixel value (pixel data value) by ADC (analog-to-digital conversion). In a second period (preset phase, P phase), a second pixel signal (noise signal) of the non-illuminated pixel is read out and converted into a digital pixel value (pixel noise value). The second period may directly precede or may directly follow the first period. The final pixel output value is obtained by subtracting the pixel noise value from the pixel data value, wherein noise effects on the final pixel output value can be reduced. According to a CDS (correlated double sampling) readout method, the P phase precedes the D phase. In a DDS (double data sampling) readout method, the D phase precedes the P phase.

SUMMARY

In particular, pixel circuits using a source follower circuit for outputting the pixel signal suffer from temporal noise that deteriorates image quality under low light conditions. CDS and DDS readout methods compare AD converted pixel signals. The present disclosure mitigates shortcomings of the discussed prior art for intensity readout. In particular, the effect of temporal noise on image quality can be reduced.

To this purpose, an image sensor assembly according to the present disclosure includes a pixel circuit and a converter circuit. The pixel circuit includes a first amplification transistor and a first selection transistor, wherein the first amplification transistor and the first selection transistor are electrically connected in series. The first amplification transistor and the first selection transistor output first pixel signals at a first pixel output, when the first selection transistor is turned on. The converter circuit receives the first pixel signals from the first selection transistor The converter circuit further receives second pixel signals from the first selection transistor or from a second selection transistor. The converter circuit converts voltage differences between the first pixel signals and the second pixel signals into digital coefficients).

Here, the converter circuit performs a kind of in-pixel correlated multiple sampling of the pixel signals before AD conversion. The method uses signals that may be in closer temporal relationship with each other as in usual CDS and DDS readout methods.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Embodiments for implementing techniques of the present disclosure (also referred to as "embodiments" in the following) will be described below in detail using the drawings. The techniques of the present disclosure are not limited to the described embodiments, and various numerical values and the like in the embodiments are illustrative only. The same elements or elements with the same functions are denoted by the same reference signs. Duplicate descriptions are omitted.

Connected electronic elements may be electrically connected through a direct, permanent low-resistive connection, e.g., through a conductive line. The terms "electrically connected" and "signal-connected" may also include a connection through other electronic elements provided and suitable for permanent and/or temporary signal transmission and/or transmission of energy. For example, electronic elements may be electrically connected or signal-connected through resistors, capacitors, and electronic switches such as transistors or transistor circuits, e.g. FETs (field effect transistors), transmission gates, and others. The load path of a transistor is the controlled path of a transistor. For example, a voltage applied to a gate of a FET controls by field effect the current flow in the load path between source and drain.

Though in the following a technology for reducing temporal noise is described in the context of certain types of image sensors for intensity readout, the technology may also be used for other types of image sensors.

Figure 1:
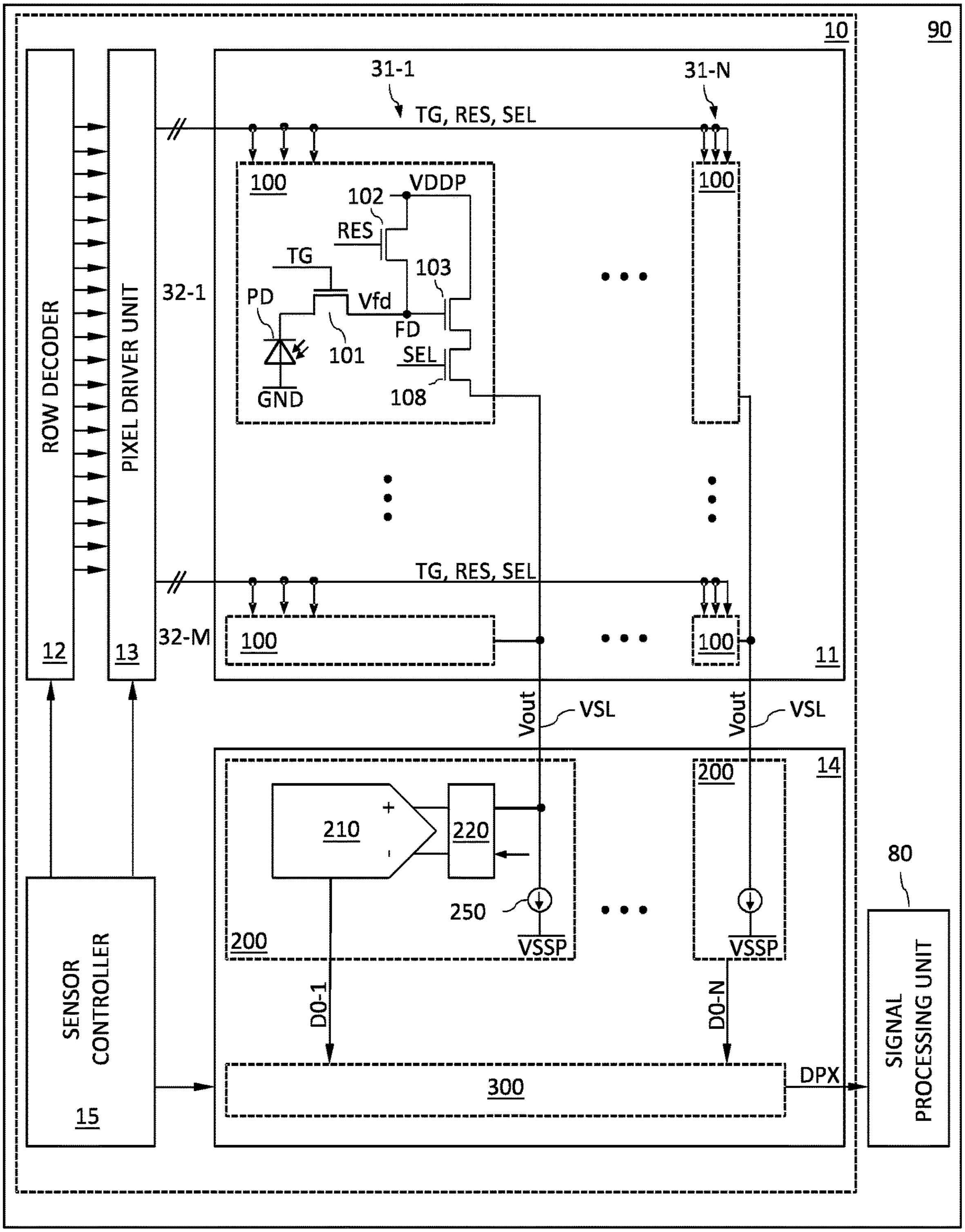
FIG. 1 is a simplified block diagram showing an image sensor assembly of a solid-state imaging that includes converter circuits for in-pixel correlated multiple sampling according to an embodiment of the present technology.

FIG. 1 illustrates a configuration example of a solid-state imaging device 90 including an image sensor assembly 10 and a signal processing unit 80 according to an embodiment of the present technology.

The image sensor assembly 10 may include a pixel array unit 11, a row decoder 12, a pixel driver unit 13, a column signal processing unit 14, and a sensor controller 15.

The pixel array unit 11 includes a plurality of identical pixel circuits 100. The pixel circuits 100 may be any active pixel sensors for intensity readout. In the illustrated embodiment, each pixel circuit 100 includes one photoelectric conversion device PD and four FETs for controlling the output signal of the pixel circuit 100. Other embodiments may refer to pixel circuits 100 with more or with less FETs, and with pixel circuits 100 with two or more photoelectric conversion devices PD.

The photoelectric conversion devices PD of the pixel array unit 11 may be arranged matrix-like in columns and rows. A subset of pixel circuits 100 assigned to the same column of photoelectric conversion devices PD may form a pixel column 31-1, . . . , 31-N. A subset of pixel circuits 100 assigned to the same row of photoelectric conversion devices PD may form a pixel row 32-1, . . . , 32-M.

The row decoder 12 and the pixel driver unit 13 control driving of each pixel circuit 100 or each pixel row 32-1, . . . , 32-M disposed in the pixel array unit 11. In particular, the row decoder 12 may supply control signals for selecting the pixel circuits 100 of a selected pixel row 32-1, . . . , 32-M to the pixel driver unit 13 according to an address latch signal from the sensor controller 15. The pixel driver unit 13 may control the FETs of the selected pixel row 32-1, . . . , 32-M according to driver timing signals supplied from the sensor controller 15 and the control signals supplied from the row decoder 12.

The output signals of the pixel circuits 100 of the same pixel column 31-1, . . . , 31-N are successively supplied to at least one data signal line (vertical signal line) VSL. The data signal lines VSL pass the output signals of the pixel circuits 100 (pixel signals) to the column signal processing unit 14.

In particular, the solid-state imaging device 90 includes pixel circuits 100 arranged in pixel columns 31-1, . . . , 31-N, wherein each pixel column 31-1, . . . , 31-N is assigned to one data signal line VSL and wherein signal outputs of the pixel circuits 100 of the same pixel column 31-1, . . . , 31-N are connected to at least one common data signal line VSL.

The column signal processing unit 14 may include one or more ADC (analog-to-digital converter) units 200. The column signal processing unit 14 may include as many ADC units 200 as the pixel array unit 11 includes data signal lines VSL. Alternatively, the number of ADC units 200 may be less than the number of data signal lines VSL and each ADC unit 200 may be multiplexed between two or more of the data signal lines VSL.

In particular, one data signal line VSL or two data signal lines VSL1, VSL2 may connect an ADC unit 200 with all pixel circuits 100 of the same pixel column 31-1, . . . , 31-N or with all pixel circuits 100 of two pixel column 31-1, . . . , 31-N. Each ADC unit 200 performs analog-to-digital conversion of various voltage differences between two pixel signals Vout, which are sequentially passed to the ADC unit 200 on the same data signal line VSL or which are simultaneously passed to the ADC unit 200 on two different data signal lines VSL. For each pixel circuit 100 of a pixel column 31-1, . . . , 31-N, an ADC unit 200 converts the various voltage differences for one pixel column 31-1, . . . , 31-N into various digital coefficients DO-1, . . . , DO-N and passes the various digital coefficients DO-1, . . . , DO-N for the pixel columns 31-1, . . . , 31—to a readout buffer 300. The readout buffer 300 passes the various digital coefficients DO-1, . . . , DO-N received from the ADC units 200 to the signal processing unit 80.

The sensor controller 15 controls the components of the image sensor assembly 10. For example, the sensor controller 15 may generate address latch signals to control the row decoder 12, may generate driving timing signals to control the pixel driver unit 13, and may generate readout control signals to control the column signal processing unit 14.

In each pixel circuit 100, the photoelectric conversion device PD photoelectrically converts incident electromagnetic radiation into electric charges. The amount of electric charge generated in the photoelectric conversion device PD corresponds to the intensity of the incident electromagnetic radiation. For example, the photoelectric conversion device PD may include or consist of a photodiode which converts electromagnetic radiation incident on a detection surface into a detector current by means of the photoelectric effect. The electromagnetic radiation may include visible light, infrared radiation and/or ultraviolet radiation. The amplitude of the detector current corresponds to the intensity of the incident electromagnetic radiation, wherein in the intensity range of interest the detector current increases approximately linearly with increasing intensity of the detected electromagnetic radiation.

In addition to the photoelectric conversion device PD, the illustrated configuration example of the pixel circuit 100 includes a floating diffusion region FD for storing charge supplied from photoelectric conversion device PD, a transfer transistor 101, a reset transistor 102, an amplification transistor 103, and a selection transistor 108. Each of the transistors is or includes an FET.

A load path of the transfer transistor 101 is electrically connected between the cathode of the photoelectric conversion device PD and the floating diffusion region FD. The transfer transistor 101 serves as transfer element for transferring charge from the photoelectric conversion device PD to the floating diffusion region FD. The floating diffusion region FD serves as temporary local charge storage. A transfer signal TG is supplied to the gate (transfer gate) of the transfer transistor 101 through a transfer control line. The transfer signal TG has an active signal level and an inactive signal level. In response to an active transfer signal TG, the transfer transistor 101 may transfer electrons photoelectrically converted by the photoelectric conversion device PD to the floating diffusion region FD.

A load path of the reset transistor 102 is electrically connected between a positive voltage supply line to which a positive pixel supply voltage VDDP is supplied and the floating diffusion region FD. A reset signal RES is supplied to the gate of the reset transistor 102 through a reset control line. The reset signal RES has an active signal level and an inactive signal level. The reset transistor 102 serves as a reset element that resets a floating diffusion potential Vfd of the floating diffusion region FD. In particular, an active reset signal RES sets the floating diffusion potential Vfd equal or approximately equal to the positive pixel supply voltage VDDP.

The floating diffusion region FD is connected to the gate of the amplification transistor 103 serving as an amplification element. The floating diffusion region FD functions as the input node of the amplification transistor 103.

The amplification transistor 103 and the selection transistor 108 are connected in series between the positive pixel supply voltage VDDP and the data signal line VSL. Thus, the amplification transistor 103 is connected to the data signal line VSL through the selection transistor 108. A select signal SEL is supplied to the gate of the selection transistor 108 through a select control line. The select signal SEL has an active signal level and an inactive signal level.

An active select signal SEL turns on the selection transistor 108. When the selection transistor 108 is turned on, the amplification transistor 103 amplifies the floating diffusion potential Vfd of the floating diffusion region FD and outputs a voltage corresponding to the floating diffusion potential Vfd to the data signal line VSL. The data signal line VSL passes the pixel signal Vout from the pixel circuit 100 to the column signal processing unit 14.

Since the respective gates of the transfer transistor 101, the reset transistor 102, and the selection transistor 108 are connected in units of pixel rows 32-1, . . . , 32-M, these operations can be simultaneously performed for each of the pixel circuits 100 of one pixel row 32-1, . . . , 32-M.

Each data signal line VSL is further connected to at least one of the ADC units 200. The ADC units 200 include constant current circuits 251, wherein each data signal line VSL is connected through at least one of the constant current circuits 251 to a negative pixel supply voltage VSSP. Each constant current circuit 251 may include a constant current source or a switched capacitor current source supplying at least temporarily a constant current to the data signal line VSL.

The amplification transistor 103 of a pixel circuit 100 connected to a data signal line VSL and the constant current circuit 251 connected to the data signal line complement to a source follower circuit passing the pixel signal Vout controlled by the floating diffusion potential Vfd to the column signal processing unit 14.

Each ADC unit 200 includes a converter circuit 210 that receives first pixel signals from the first selection transistor 108 in the pixel array unit 11 and second pixel signals. The second pixel signals may be received from the first selection transistor 108, from a second selection transistor 108 in the same pixel circuit 100, or from a second selection transistor 108 in another pixel circuit 100 of the pixel array unit 11. The converter circuit 210 converts voltage differences between the first pixel signals and the second pixel signals into digital coefficients DO-1, . . . , DO-N. In addition, each ADC unit 200 includes a switching assembly 220 for routing the pixel signals Vout from the data signal lines VSL to the converter circuit 210.

The sensor controller 15 controls the column signal processing unit 14. In particular, the sensor controller 15 may synchronize the AD conversion in the ADC units 200 with the control signals of the pixel circuits 100. In addition, the sensor controller 15 may generate a readout control signal that controls the transfer of the digital coefficients DO-1, . . . , DO-N from the readout buffer 300 to the signal processing unit 80.

The signal processing unit 80 may include an evaluation unit configured to obtain a digital signal value on the basis of the digital coefficients (DR, DQ, d0, . . . , dn).

In the solid-state imaging device 90 as illustrated in FIG. 1, a readout of one pixel circuit 100 typically includes two periods: In a first period, a first pixel output signal (data signal) is read out directly after illumination of the pixel and converted into a digital pixel value (pixel data value) by AD (analog-to-digital) conversion. In a second period, a second pixel output signal (noise signal) of the non-illuminated pixel is read out and converted into a digital pixel value (pixel noise value). The second period may directly precede or may directly follow the first period. According to a CDS (correlated double sampling) readout method, the P phase precedes the D phase. In a DDS (double data sampling) readout method, the D phase precedes the P phase.

The digital coefficients DO-1, . . . , DO-N are obtained by AD conversion of voltage differences between signals obtained in the two periods, wherein the effect of temporal noise in the pixel circuits 100, e.g., in the amplification transistor 103 and/or the floating diffusion FD can be reduced.

Figure 2:
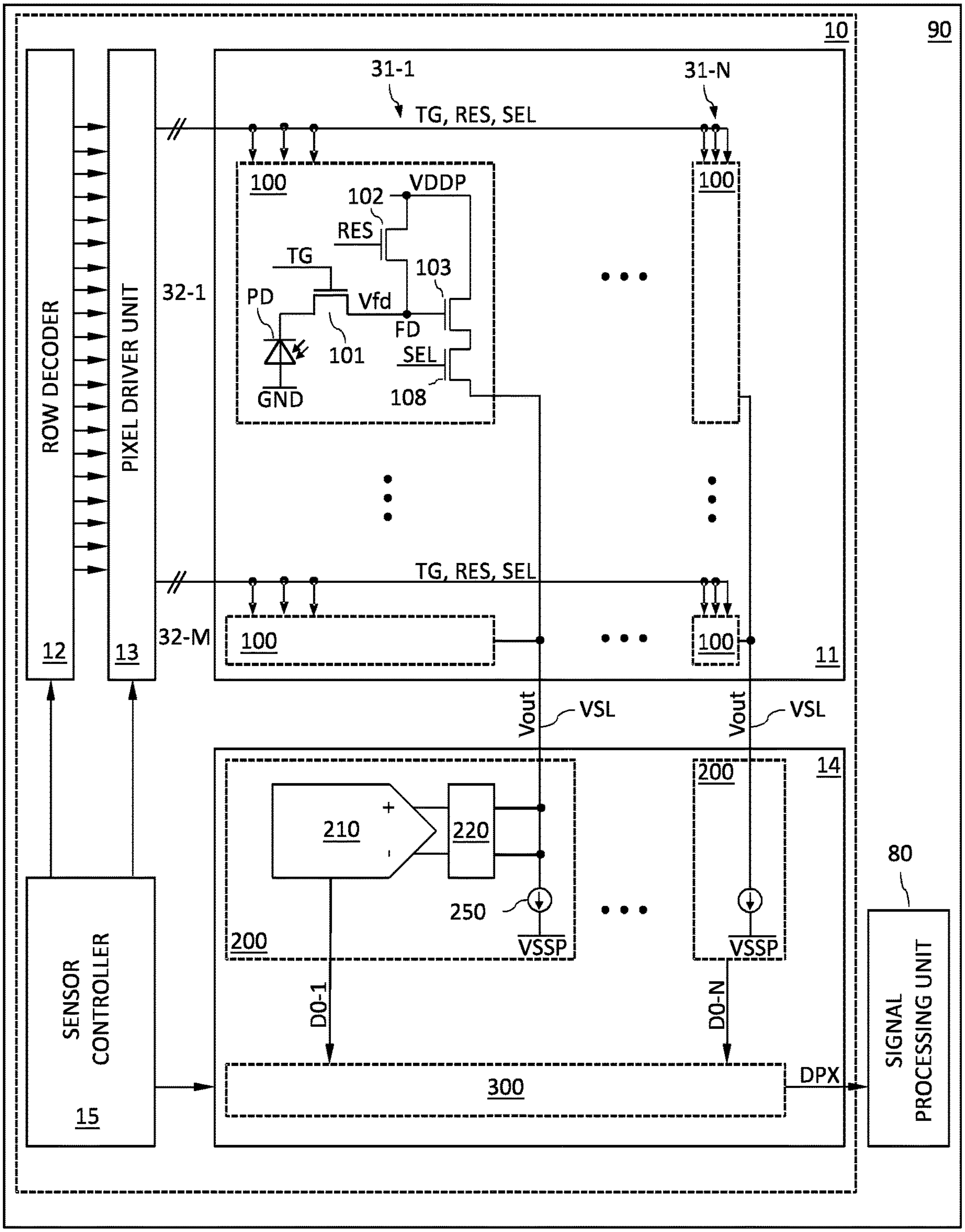
FIG. 2 is a simplified block diagram showing an image sensor assembly of a solid-state imaging that includes converter circuits for in-pixel correlated multiple sampling according to an embodiment comparing first and second pixel signals obtained from the same amplification and selection transistors.

In FIG. 2 the converter circuit 210 successively receives the first pixel signals and the second pixel signals on the same data signal line VSL.

Figure 3:
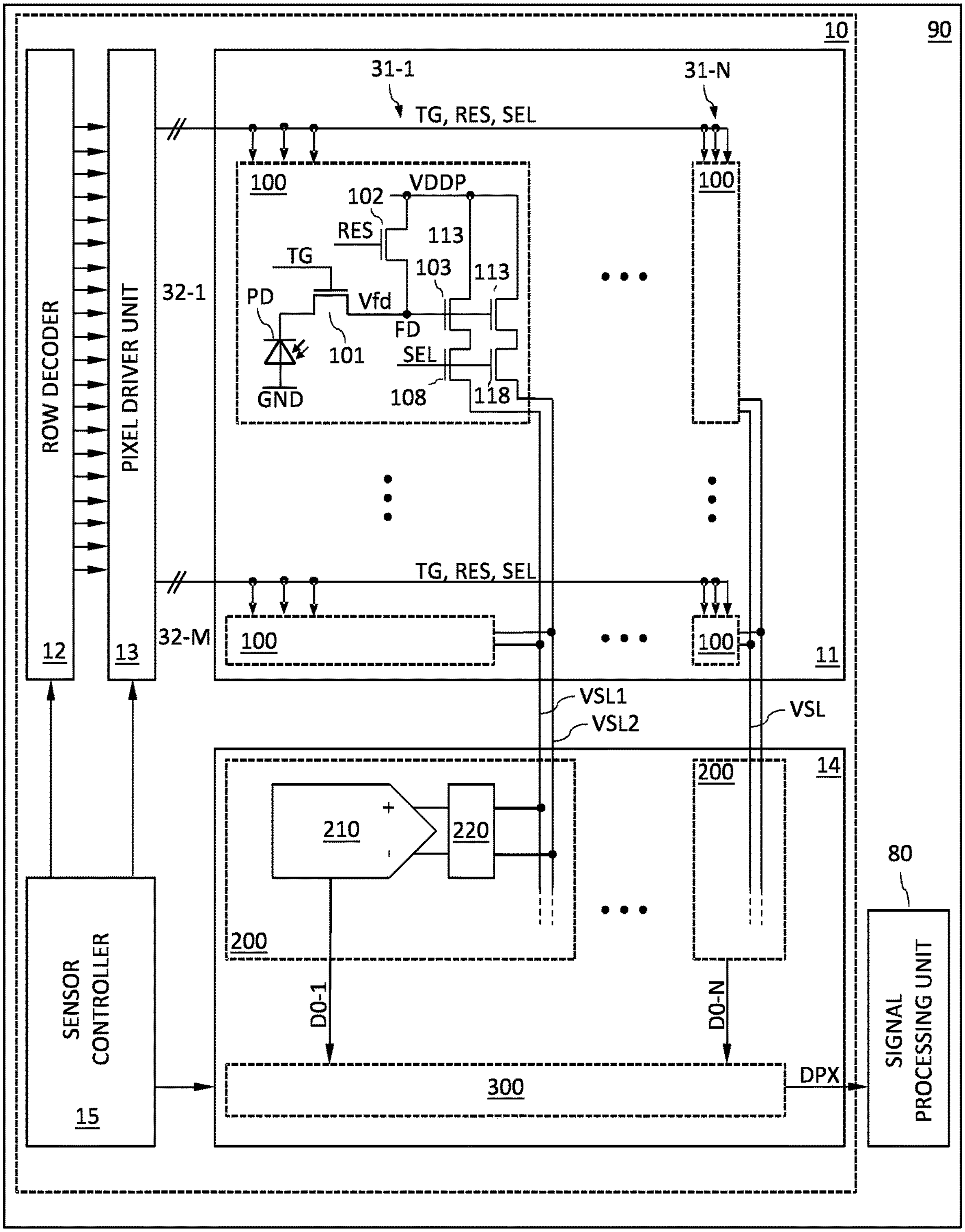
FIG. 3 is a simplified block diagram showing an image sensor assembly of a solid-state imaging that includes converter circuits for in-pixel correlated multiple sampling according to an embodiment comparing first and second pixel signals obtained from different amplification and selection transistors of the same pixel circuit.

In FIG. 3, the first selection transistors 108 are electrically connected to first data signal lines VSL1. Each pixel circuit 100 further includes a second amplification transistor 113 and a second selection transistor 118, wherein the second amplification transistor 113 and the second selection transistor 118 are electrically connected in series between the positive pixel supply voltage VDDP and a second data signal line VSL2. The converter circuit 210 simultaneously receives the first pixel signals on the first data signal line VSL1 and the second pixel signals on the second data signal line VSL2.

Figure 4:
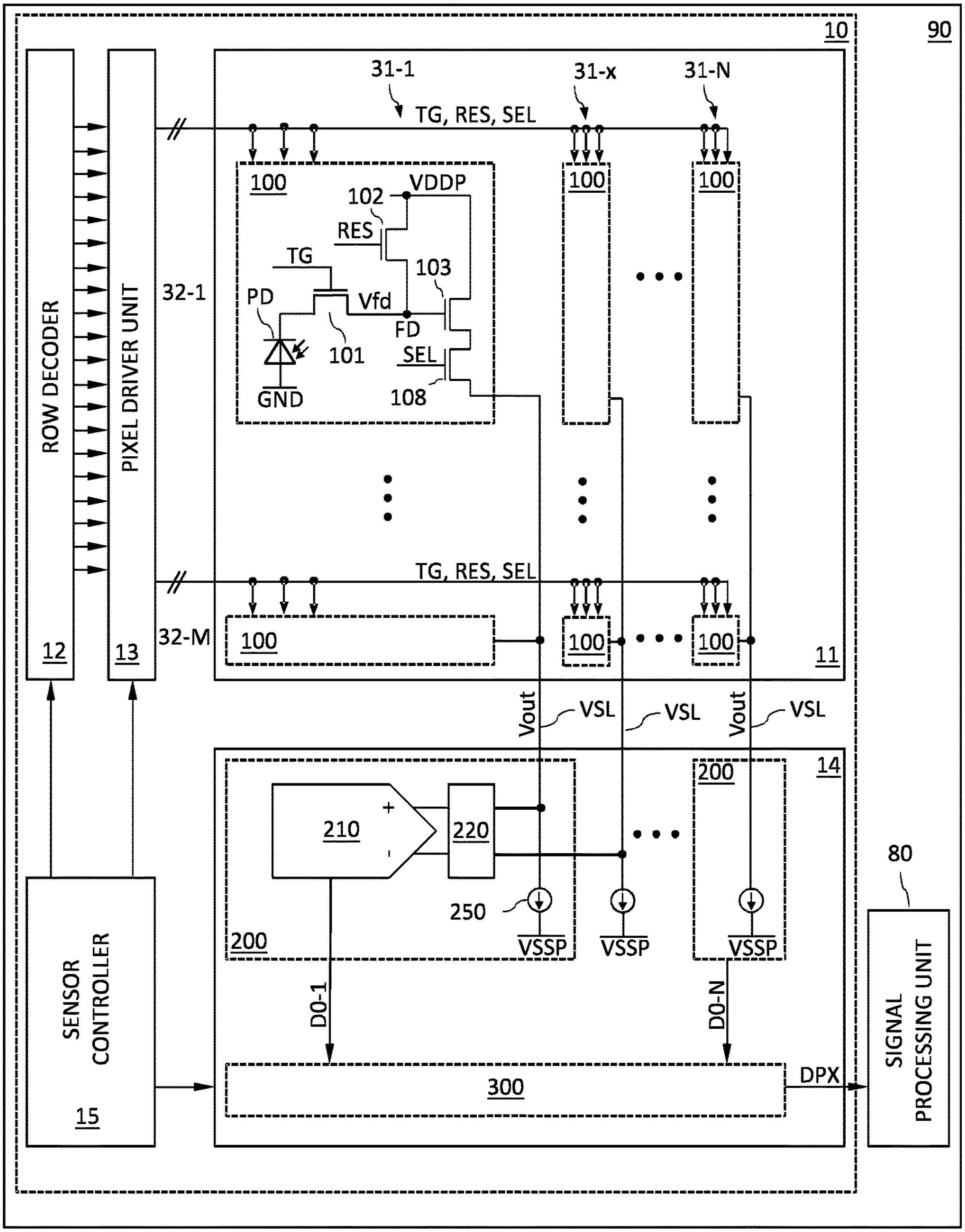
FIG. 4 is a simplified block diagram showing an image sensor assembly of a solid-state imaging that includes converter circuits for in-pixel correlated multiple sampling according to an embodiment comparing first and second pixel signals obtained from amplification and selection transistors of different pixel circuits.

In FIG. 4 the converter circuit 210 simultaneously receives the first pixel signals on a data signal line VSL of a first one of the pixel columns 31-1, . . . , 31-N and the second pixel signals on a data signal line VSL of a second one of the pixel columns 31-1, . . . , 31-N.

Figure 5:
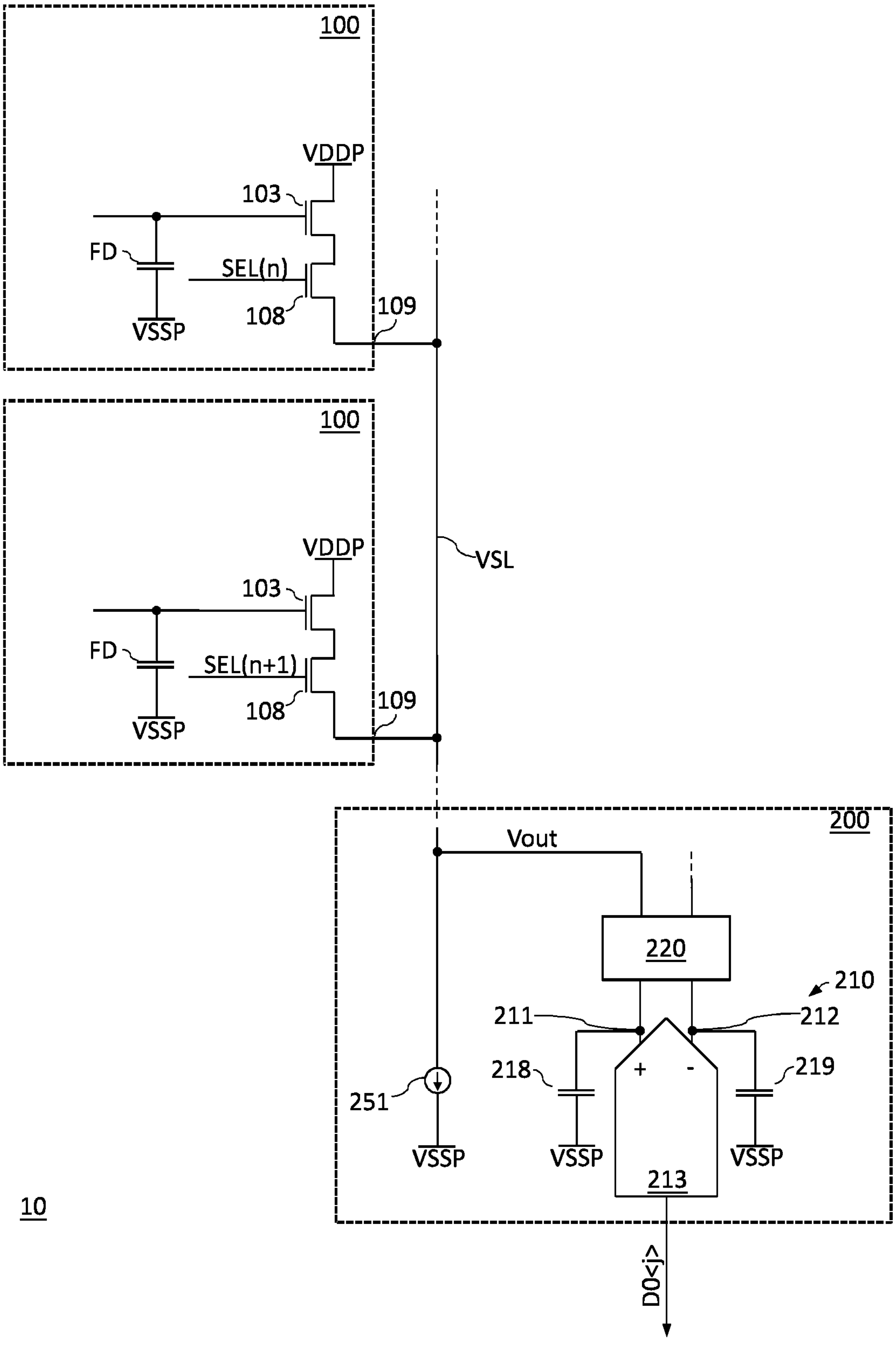
FIG. 5 is a simplified circuit diagram of an output stage of a pixel circuit and a converter circuit according to another embodiment of the present technology.

FIG. 5 shows a part of an image sensor assembly 10 with a pixel circuit 100 and a converter circuit 210. The pixel circuit 100 includes a first amplification transistor 103 and a first selection transistor 108, wherein the first amplification transistor 103 and the first selection transistor 108 are electrically connected in series. When the first selection transistor 108 is turned on, the first amplification transistor 103 and the first selection transistor 108 output first pixel signals at a first pixel output 109. The converter circuit 210 receives the first pixel signals from the first selection transistor 108 and second pixel signals from the first selection transistor 108 or from a second selection transistor. The converter circuit 210 converts voltage differences between the first pixel signals and the second pixel signals into digital coefficients d0, . . . , dn, DQ, DR.

The pixel circuit 100 may be any pixel circuit suitable for intensity readout, provided that the pixel circuit 100 includes an output part with an amplification transistor controlled by electric charge derived from a photocurrent, and a selection transistor for selectively connecting one selected pixel circuit with a data signal line, wherein load paths of the amplification transistor and the selection transistor are electrically connected is series between a supply potential and a data line.

In the illustrated embodiment, a floating diffusion potential Vfd of a floating diffusion FD is applied to a gate of the first amplification transistor 103. A select signal is applied to a gate of the first selection transistor 108. Load paths of the first amplification transistor 103 and the first selection transistor 108 are electrically connected is series between a positive pixel supply potential VDDP and the first pixel output 109. A data signal line VSL electrically connects the pixel outputs 109 of a plurality of identical pixel circuits 100 of the same pixel column.

The converter circuit 210 may include a differential analog-to-digital converter 213 that converts differential input signals applied between a first converter input 211 and a second converter input 212 into the digital coefficients DQ, DR, d0, . . . , dn. Each differential input signal results from applying one of the first pixel signals to the first converter input 211 and from applying one of the second pixel signals to the second converter input 212.

The differential analog-to-digital converter 213 directly evaluates the voltage difference between the first converter input 211 and the second converter input 212. For example, the differential analog-to-digital converter 213 may include a differential pair as input stage, wherein the first converter input 211 is connected or coupled to a gate of a first transistor of the differential pair and wherein the second converter input 212 is connected or coupled to a gate of a second transistor of the differential pair.

The differential analog-to-digital converter 213 may reduce the effect of noise occurring along the signal paths for the first and second pixel signals provided the first and second pixel signals are routed together, since such noise affects both pixel signals equally. The differential analog-to-digital converter 213 may also reject common-mode noise on the power supply lines since such common-mode noise does not affect the differential input signal.

The converter circuit 210 is part of an ADC unit 200. The ADC unit 200 may further include a constant current circuit 251 between the pixel output 109 at one side and a constant supply voltage at the other side. In the illustrated ADC unit 200, the constant current circuit 251 is electrically connected between the first pixel outputs 109 of the pixel circuits 100 and the negative pixel supply potential VSSP. The constant current circuit 251 may include a constant current source such as an FET with constant gate bias, or a switched capacitor current source supplying at least temporarily a constant current to the data signal line VSL.

The pixel circuit 100 outputs first pixel signals. The first pixel signals may include at least one signal obtained from the illuminated pixel circuit (pixel data signal) and/or at least one signal obtained from the non-illuminated pixel circuit (pixel noise signal).

The ADC unit 200 receives the first pixel signals and second pixel signals. The second pixel signals may be received from the same pixel output of the same pixel circuit 100 as the first pixel signals, from another pixel output of the same pixel circuit 100, or form the pixel output of another pixel circuit. The second pixel signals may include at least one signal obtained from an illuminated pixel circuit (pixel data signals) and/or at least one signal obtained from a non-illuminated pixel circuit (pixel noise signal).

The ADC unit 200 of the image sensor assembly 10 may further include a switching assembly 220 that connects the first converter input 211 with the first pixel output 109 and that disconnects the second converter input 212 from the first pixel output 109 in a first operational state. The switching assembly 220 further disconnects the first converter input 211 from the first pixel output 109 and connects the second converter input 212 to the first pixel output 109 in a second operational state.

The switching assembly 220 may successively pass a first pixel signal and/or a second pixel signal of the first and second pixel signals to each of the first and second converter inputs 211, 212. In this way, the image sensor assembly 10 allows a correlated multi-sampling of various first and second pixel signals with alternating sign prior to AD conversion.

Pixel signals are typically prone to thermal noise (kTC noise) and 1/f noise. The kTC noise may include reset noise generated in the floating diffusion when the floating diffusion is disconnected from other circuits. The 1/f noise may inter alia include components of RTS (random telegram signal) noise with a frequency spectrum such that the power spectral density is inversely proportional to the frequency. Equation #1a summarizes the noise components in the pixel signals, wherein S(f) is the power spectral density and wherein $\alpha_1$ and $\alpha_2$ are application specific coefficients. The first summand describes the thermal noise and the second summand the 1/f noise:

$$S(f) = \alpha_1 kT + \frac{\alpha_2}{f} \quad \#1a$$

In typical correlated multiple sampling, a number N of samples is taken and the mean of the samples is used as the result. For a small number N of samples, correlated multiple sampling improves SNR by a factor √N (sqrt(N)). The effect of correlated multiple sampling on the SNR is only appreciable for a small number N of samples. A larger number N of samples results in a longer time interval $T_H$ between the samples for the reset signal and the data signal for CDS. A longer time interval $T_H$ degrades noise reduction due to the 1/f noise that contains the more noise, the longer the time interval $T_H$.

The ADC unit 200 with the switching assembly 220 and the differential converter circuit 210 facilitates application of various pixel signals on each of the first and second converter inputs 211, 212 with alternating sign. In this way, the image sensor assembly 10 allows a more efficient correlated multi-sampling of various first and second pixel signals prior to AD conversion.

Figure 6A:
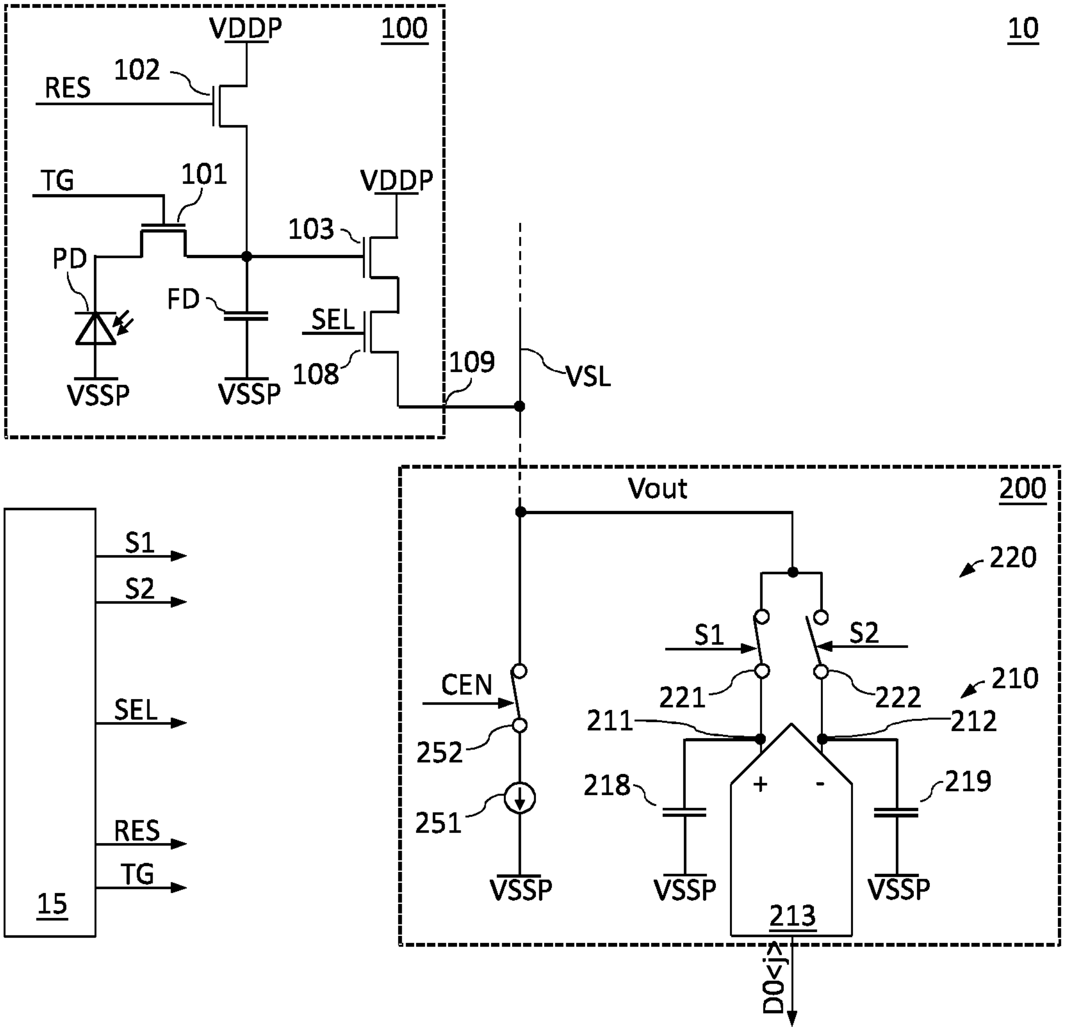
FIG. 6A is a simplified circuit diagram of a pixel circuit and a converter circuit according to an embodiment with first and second pixel signals successively obtained from the same selection transistor.
Figure 6B:
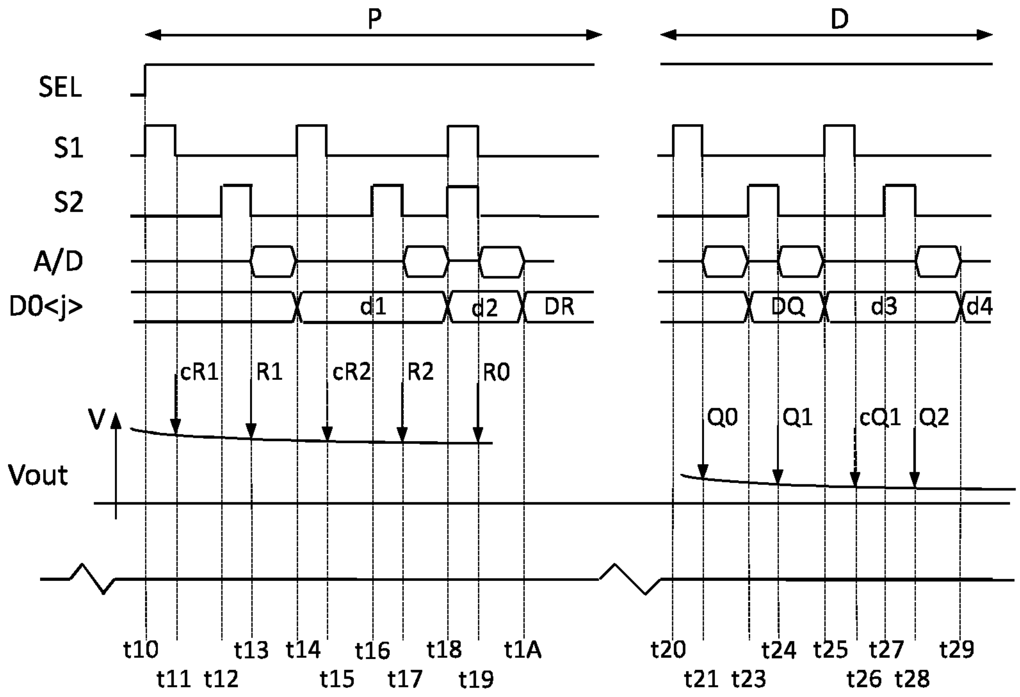
FIG. 6B is a simplified time diagram of various internal signals and output signals of the pixel circuit and the converter circuit of FIG. 6A.

FIGS. 6A and 6B relate to an image sensor arrangement 10 that provides a time division multiplexing scheme for sequentially transmitting the first pixel signals and the second pixel signals on the same data signal line VSL.

In particular, the converter circuit 210 is configured to successively receive the first pixel signals and the second pixel signals from the first pixel output 109, and to store a first pixel signal until a next second pixel signal is received and/or to store a second pixel signal until a next first pixel signal is received.

A correlated multiple sampling on the basis of differential input signals with alternating signs of the differential input signal can be implemented at low additional effort and in particular without the requirement of additional data signal lines.

In addition, FIG. 6A shows the pixel circuit 100 as of a 4T-type including one photoelectric conversion device PD, a transfer transistor 101, and a reset transistor 102, the amplification transistor 103 and the selection transistor 108 as described above.

The ADC unit 200 further includes a column select switch 252 for temporarily switching on and off the data signal line VSL. The column select switch 252 may be an electronic switch such as an MOSFET. A column select signal CEN controls the column select switch 252. The column select signal CEN has an active signal level and an inactive signal level. In response to an active column select signal CEN, the column select switch 252 turns on and connects the constant current circuit 251 to the data signal line VSL.

The converter circuit 210 includes a first input capacitance 218 effective between the first comparator input 211 and the negative pixel supply potential VSSP. A second input capacitance 219 is effective between the second comparator input 212 and the negative pixel supply potential VSSP. The first and second input capacitances 218, 219 may include only parasitic input capacitances of the differential analog-to-digital converter 213 or additional capacitive structures or elements provided in parallel to the parasitic input capacitances of the differential analog-to-digital converter 213. With the first and second input capacitances 218, 219 the converter circuit 210 is capable to temporarily store (hold) a pixel signal previously transmitted over the data signal line VSL at the first comparator input 211 until a next pixel signal is received over the data signal line VSL at the second comparator input 212, and to temporarily store (hold) a pixel signal previously transmitted over the data signal line VSL at the second comparator input 212 until a next pixel signal is received over the data signal line VSL at the first comparator input 211.

The switching assembly 220 further includes a first switch 221 connected between the data signal line VSL and the first converter input 211 and a second switch 222 connected between the data signal line VSL and the second converter input 212.

A first switch signal S1 controls the first switch 221. The first switch signal S1 has an active signal level and an inactive signal level. In response to an active first switch signal S1, the first switch 221 turns on and connects the first converter input 211 to the data signal line VSL.

A second switch signal S2 controls the second switch 222. The second switch signal S2 has an active signal level and an inactive signal level. In response to an active second switch signal S2, the second switch 222 turns on and connects the second converter input 212 and the data signal line VSL.

The image sensor assembly 10 further includes a sensor controller 15 that controls the reset signal RES, the transfer signal TG, the select signal SEL, the column select signal CEN, the first switch signal S1, and the second switch signal S2 according to the timing scheme illustrated in FIG. 6B.

FIG. 6B shows the timing of the select signal SEL, the first switch signal S1, and the second switch signal S2, wherein throughout all time diagrams, the active signal level of a control signal is indicated by high level ("1") and the inactive signal level is indicated by low level ("0"). In addition, FIG. 6B shows further the time periods with active AD conversion (A/D) and the time periods, in which digital coefficients D0<j> are available on a digital output of the differential analog-to-digital converter 213.

The timing diagram includes a preset phase P starting from t=t10 and a data phase D starting form t=t20. In the preset phase P, the pixel signal Vout output from the pixel circuit 100 of FIG. 6A is a noise signal, read out directly after a reset of the pixel circuit 100 and prior to transfer of charge from the photoelectric conversion device PD to the floating diffusion FD of the pixel circuit 100 of FIG. 6A.

The reset sets the floating diffusion potential Vfd to a voltage level close to the positive pixel supply voltage VDDP.

The high floating diffusion potential Vfd controls a comparatively high current through the data signal line VSL, wherein a voltage level of the pixel signal Vout on the data signal line VSL is almost the same as the floating diffusion potential Vfd. In the data phase D, the pixel signal Vout output by the pixel circuit 100 of FIG. 6A is a data signal, read out after illumination of the photoelectric conversion device PD of the pixel circuit 100. In the data phase D, a voltage level of the pixel signal Vout is lower than in the preset phase P.

At t=t10 in the preset phase P, the select signal SEL becomes active such that the selected pixel circuit 100 outputs the pixel signal Vout to the data signal line VSL. Also at t=t10 or later, the first switch signal S1 becomes active until t=t11, whereas the second switch signal S2 remains inactive.

The instantaneous pixel signal on the data signal line VSL is applied as first pixel signal to the first converter input 211 and held, and a previous instance of the pixel signal may have been previously applied as second pixel signal to the second converter input 212 and held.

Between t=t11 and t=t12, the differential analog-to-digital converter 213 may take a complementary first regular noise sample cR1 by converting the difference between the instantaneous pixel signal Vout and the previous pixel signal into a complementary first differential coefficient cd1. In the illustrated example, conversion of the difference between the instantaneous pixel signal Vout and the previous pixel signal into a complementary first differential coefficient cd1 is omitted.

At t=t12, the second switch signal S2 becomes active until t=t13, whereas the first switch signal S1 remains inactive. The instantaneous pixel signal Vout on the data signal line VSL is applied to the second converter input 212, whereas the previously applied pixel signal is still held at the first converter input 211. Between t=t13 and t=t14, the differential analog-to-digital converter 213 takes a first regular noise sample R1 by converting the difference between the instantaneous pixel signal and the previous pixel signal into a first differential coefficient d1. Also between t=t12 and t=t14, the sensor controller 15 may control the differential analog-to-digital converter 213 to output the previously obtained complementary first differential coefficient cd1. In the illustrated example, output of the complementary first differential coefficient cd1 is omitted.

At t=t14, the first switch signal S1 becomes active until t=t15, whereas the second switch signal S2 remains inactive. The instantaneous pixel signal on the data signal line VSL is applied to the first converter input 211, whereas the previously applied pixel signal is still held at the second converter input 212.

Between t=t15 and t=t16, the differential analog-to-digital converter 213 may take a complementary second regular noise sample cR2 by converting the difference between the instantaneous pixel signal Vout and the previous pixel signal into a complementary second differential coefficient cd2. In the illustrated example, conversion of the difference between the instantaneous pixel signal Vout and the previous pixel signal into the complementary second differential coefficient cd2 is omitted.

Also starting from t=t14, the sensor controller 15 may control the differential analog-to-digital converter 213 to output the previously obtained first differential coefficient d1.

At t=t16, the second switch signal S2 becomes active until t=t17, whereas the first switch signal S1 remains inactive. The instantaneous pixel signal on the data signal line VSL is applied to the second converter input 212, whereas the previously applied pixel signal is still held at the first converter input 211. Between t=t17 und t=t18, the differential analog-to-digital converter 213 takes a second regular noise sample R2 by converting the difference between the instantaneous pixel signal and the previous pixel signal into a second differential coefficient d2. In addition, the sensor controller 15 may control the differential analog-to-digital converter 213 to output the previously obtained complementary second differential coefficient d2 between t=t16 and t=t18. In the illustrated example, output of the complementary second differential coefficient cd2 is omitted.

The first and second switch signals S1, S2 become synchronously active between t=t18 and t=t19. The same instance of the pixel signal is applied as first pixel signal to the first converter input 211 and held, and as second pixel signal to the second converter input 212 and held. Between t=t19 and t=t1A, the differential analog-to-digital converter 213 takes a precursor noise sample R0 by converting the difference between the two signals applied to the first and second converter inputs 211, 212 into a noise coefficient DR. In addition, the sensor controller 15 may control the differential analog-to-digital converter 213 to output the previously obtained second differential coefficient d2 between t=t18 and t=t1A, and to control the differential analog-to-digital converter 213 to output the previously obtained noise coefficient DR starting from t=t1A.

Compared to embodiments that may obtain the noise coefficient DR by simultaneously activating the first and second switch signals S1, S2 at the beginning of the preset phase P, obtaining the noise coefficient DR at the end of the preset phase P ensures that the 1/f noise contribution from the readout of the noise coefficient DR is not a function of the number N of samples, since the time interval $T_H$ between the samples for the reset signal and the data signal for CDS remains constant.

Further digital temporal noise coefficients may be obtained in the same way as the first and second differential coefficients d1, d2 between the second regular noise sample and the precursor noise sample, hence between t=t17 and t=t18. In the illustrated embodiment, both the signal on the first converter input 211 and the signal on the second converter input 212 are updated between two directly subsequent regular noise samples R(k) and R(k+1), wherein in each case the former instance of the pixel signal Vout is applied as first pixel signal to the first converter input 211 and the newer instance of the pixel signal Vout is applied as second pixel to the second converter input 212.

The differential AD conversion obtains the differential coefficients d1, d2, d3, d4 by subtracting consecutive "noise samples" from each other. The contribution of 1/f noise to the differential voltages across the first and second converter inputs is related to the length of the time interval $T_0$ between the two consecutive samples for the differential AD conversion. With the assumption that sampling of the pixel signals on the first and second converter inputs can take less time than the differential A/D conversion, a comparatively short time interval $T_0$ can be achieved. Furthermore, it is possible to pipeline the two sampling operations with the differential A/D conversion.

Provided that the differential A/D conversion is sufficiently fast, A/D conversion can be directly applied to each sample to produce a sequence d1=$V_{R1}-V_{R2}$, d2=$V_{R3}-V_{R2}$, d3=$V_{R3}-V_{R4}$ . . . etc. In each case, an even number of noise samples is evaluated for both the preset phase P (R1, R2, . . . ) and the data phase D (Q1, Q2, . . . ). For CDS, one single sample is evaluated for the reset pixel (DR) and one single signal is evaluated for the illuminated pixel (DQ).

In the embodiment further providing the complementary regular noise samples cR(k) and cR(k+1), only one of the signal on the first converter input 211 and the signal on the second converter input 212 is updated between two directly subsequent regular noise samples R(k) and cR(k), or cR(k) and R(k+1), wherein any new instance of the pixel signal Vout is compared once with the previous instance of the pixel signal Vout and once with the following instance of the pixel signal Vout.

Prior to t=t20 at the start of the data phase D, an active transfer signal TG connects the cathode of the photoelectric conversion device PD of the pixel circuit 100 of FIG. 6A with the floating diffusion FD. The floating diffusion potential Vfd decreases the more the higher the photocurrent and a pixel signal Vout with a typically lower voltage level than in the preset phase P results on the data signal line VSL.

Also at t=t20 or later, the first switch signal S1 becomes active until t=t21, whereas the second switch signal S2 remains inactive. The instantaneous pixel signal (data signal) is applied as first pixel signal to the first converter input 211 and held, whereas the previously applied instance of the pixel signal is held at the second converter input 212. Between t=t21 and t=t23, the differential analog-to-digital converter 213 takes a differential D/P sample Q0 by converting the difference between the two signals applied to the first and second converter inputs 211, 212 into a differential D/P coefficient DQ.

At t=t23, the second switch signal S2 becomes active until t=t24, whereas the first switch signal S1 remains inactive. The instantaneous pixel signal Vout on the data signal line VSL is applied to the second converter input 212, whereas the previously applied pixel signal is still held at the first converter input 211. Between t=t24 and t=t25, the differential analog-to-digital converter 213 takes a first regular data sample Q1 by converting the difference between the instantaneous pixel signal and the previous pixel signal into a third differential coefficient d3. Also between t=t23 and t=t25, the sensor controller 15 may control the differential analog-to-digital converter 213 to output the previously obtained differential D/P coefficient DQ.

At t=t25, the first switch signal S1 becomes active until t=t26, whereas the second switch signal S2 remains inactive. The instantaneous pixel signal Vout on the data signal line VSL is applied to the first converter input 211, whereas the previously applied pixel signal is still held at the second converter input 212.

Between t=t26 and t=t27, the differential analog-to-digital converter 213 may take a complementary first regular data sample cQ1 by converting the difference between the instantaneous pixel signal Vout and the previous pixel signal into a complementary third differential coefficient cd3 (not illustrated). Also starting from t=t25, the sensor controller 15 may control the differential analog-to-digital converter 213 to output the previously obtained third differential coefficient d3.

In the illustrated example, sampling of a complementary third differential coefficient is omitted. Instead, at t=t27, the second switch signal S2 becomes active until t=t28, whereas the first switch signal S1 remains inactive. The instantaneous pixel signal on the data signal line VSL is applied to the second converter input 212, whereas the previously applied pixel signal is still held at the first converter input 211. Between t=t28 und t=t29, the differential analog-to-digital converter 213 takes a second regular data sample Q2 by converting the difference between the instantaneous pixel signal and the previous pixel signal into a fourth differential coefficient d4. In addition, the sensor controller 15 may control the differential analog-to-digital converter 213 to output the previously obtained third differential coefficient d3 between t=t25 and t=t29.

Further digital differential coefficients may be obtained in the same way. In the illustrated embodiment, both the signal on the first converter input 211 and the signal on the second converter input 212 are updated between two directly subsequent regular data samples Q(k) and Q(k+1), wherein in each case the former instance of the pixel signal Vout is applied to the first converter input 211 and the newer instance of the pixel signal Vout is applied to the second converter input 212.

In the embodiment further providing complementary regular data samples cQ(k), cQ(k+1), only one of the signal on the first converter input 211 and the signal on the second converter input 212 is updated between two directly subsequent regular data samples Q(k) and cQ(k), or cQ(k) and Q(k+1), wherein any new instance of the pixel signal Vout is compared once with the previous instance of the pixel signal Vout and once with the following instance of the pixel signal Vout.

Table 1 gives an overview of the pixel signals, the comparator inputs and the digital coefficients obtained at the various samples, wherein the first comparator input is the positive input + and the second comparator input is the negative input − of the differential analog-to-digital converter 213 of FIG. 6A:

| Sample | cR1 | R1 | cR2 | R2 | . . . | $R_0$ | $Q_0$ | Q1 | cQ1 | Q2 | . . . |
|---|---|---|---|---|---|---|---|---|---|---|---|
| + | $Vc_{R1}$ | $Vc_{R1}$ | $Vc_{R2}$ | $Vc_{R2}$ | . . . | $V_{R0}$ | $V_{Q0}$ | $V_{Q0}$ | $Vc_{Q1}$ | $Vc_{Q1}$ | . . . |
| − | ? | $V_{R1}$ | $V_{R1}$ | $V_{R2}$ | . . . | $V_{R0}$ | $V_{R0}$ | $V_{Q1}$ | $V_{Q1}$ | $V_{Q2}$ | . . . |
| D0<j> | cd1 | d1 | cd2 | d2 | . . . | $D_{R0}$ | $D_{Q0}$ | d3 | cd3 | d4 | . . . |

The method includes a digital correlated double sampling concerning $V_Q$ and $V_R$, and a digital correlated multiple sampling with alternating sign for both $V_Q$ and $V_R$ according to equations #1 and #2:

$$\sum_{n=1}^{N}(-1)^{n+1}V_R(nT_0) \quad \#1$$

$$\sum_{n=1}^{N}(-1)^{n+1}V_Q(nT_0) \quad \#2$$

The digital value $D_{CDS}$ for a data signal can be calculated according to equation #3 or #4:

$$D_{CDS}=D_{Q0}-D_{R0}-\sum_{n=1}^{N}d_n+\sum_{n=N+1}^{2N}d_n \quad \#3$$

$$D_{CDS}=D_{Q0}-D_{R0}-\sum_{n=1}^{N}(-1)^{n+1}d_n+\sum_{n=N+1}^{2N}(-1)^{n+1}d_n \quad \#4$$

Figure 7A:
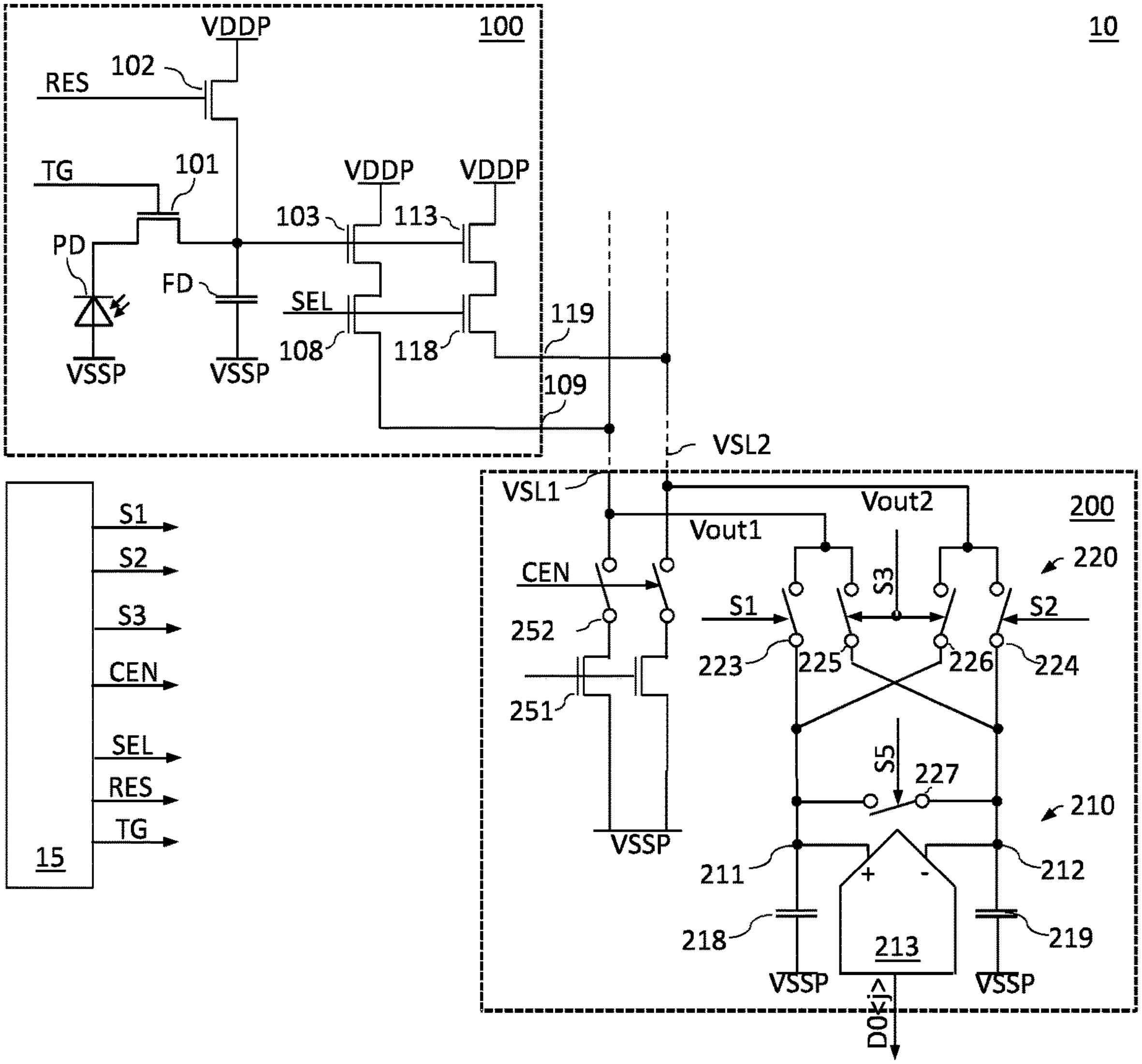
FIG. 7A is a simplified circuit diagram of a pixel circuit and a converter circuit according to an embodiment with first and second pixel signals simultaneously obtained from different selection transistors of the same pixel circuit.
Figure 8A:
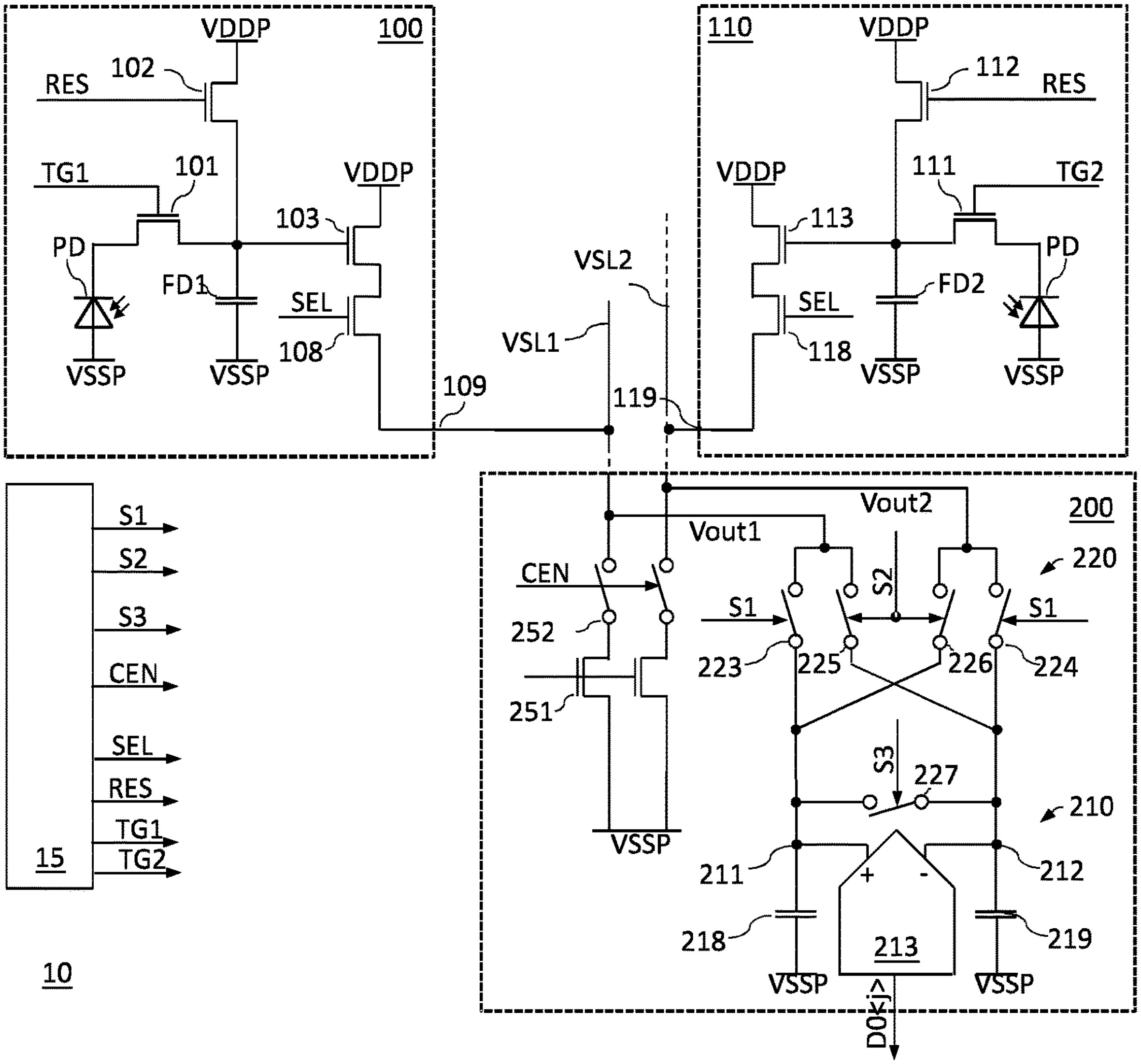
FIG. 8A is a simplified circuit diagram of a pixel circuit and a converter circuit according to an embodiment with first and second pixel signals simultaneously obtained from selection transistors of two different pixel circuits.

FIG. 7A and FIG. 8A show image sensor assemblies 10 that simultaneously apply the first pixel signal to a first one of the first converter input 211 and the second converter input 212, and the second pixel signal to the other one of the first converter input 211 and the second converter input 212.

In particular, the image sensor assembly 10 further includes a second amplification transistor 113 and a second selection transistor 118 electrically connected in series. The second amplification transistor 113 and the second selection transistor 118 output the second pixel signals at a second pixel output 119, when the second selection transistor 118 is on.

Load paths of the second amplification transistor 113 and the second selection transistor 118 are electrically connected is series between the positive pixel supply potential VDDP and the second pixel output 119.

In particular, the first amplification transistor 103 and the second amplification transistor 113 may have a same threshold voltage. For example, the first amplification transistor 103 and the second amplification transistor 113 may have the same channel width and channel length and the same electrical characteristics.

Further, a gate of the first selection transistor 108 and a gate of the second selection transistor 118 may be electrically connected. The first pixel output 109 may be connected to a first data signal line VSL1, and the second pixel output 119 may be connected to a second data signal line VSL2.

In particular, the first selection transistor 108 and the second selection transistor 118 may be controlled by the same selection signal SEL, wherein the first selection transistor 108 outputs a first pixel signal on the first data signal line VSL1, and simultaneously the second selection transistor 118 outputs a second pixel signal on the second data signal line VSL2.

The second amplification transistor 113 and the second selection transistor 118 may be part of the same pixel circuit 100 that includes the first amplification transistor 103 and the first selection transistor 108 or may form part of another pixel circuit 100.

FIG. 7A refers to an embodiment with the same pixel circuit 100 including the first and second amplification transistors 103, 113 and the first and second selection transistor 108, 118.

In particular, a gate of the first amplification transistor 103 and a gate of the second amplification transistor 108 are electrically connected. A floating diffusion potential Vfd of the floating diffusion FD is applied to the gate of the first amplification transistor 103 and to the gate of the second amplification transistor 113.

The ADC unit 200 includes a constant current circuit 251 and a column select switch 252 for temporarily switching on and off the first data signal line VSL1, and a constant current circuit 251 and a column select switch 252 for temporarily switching on and off the second data signal line VSL2. A column select signal CEN controls the column select switches 252. In response to an active column select signal CEN, both column select switches 252 turn on and connect the first data signal line VSL1 with a first one of the constant current circuits 251 and the second data signal line VSL2 with a second one of the constant current circuits 251.

The switching assembly 200 may include a third switch 223 connected between the first data signal line VSL1 and the first converter input 211, a fourth switch 224 connected between the second data signal line VSL2 and the second converter input 212, a fifth switch 225 connected between the first data signal line VSL1 and the second converter input 212, and a sixth switch 226 connected between the second data signal line VSL2 and the first converter input 211.

A first switch signal S1 controls the third switch 223. In response to an active first switch signal S1, the third switch 223 turns on and connects the first converter input 211 and the first data signal line VSL1.

A second switch signal S2 controls the fourth switch 224. In response to an active second switch signal S2, the fourth switch 224 turns on and connects the second converter input 212 and the second data signal line VSL2.

A third switch signal S3 controls the fifth switch 225 and the sixth switch 226. In response to an active third switch signal S3, the fifth switch 225 and the sixth switch 226 turn on and connect the first converter input 211 and the second data signal line VSL2, and the second converter input 212 and the first data signal line VSL1.

Alternatively, the third switch signal S3 controls only the fifth switch 225 and a fourth switch signal S4 (not illustrated) controls the sixth switch 226. In response to an active third switch signal S3, the fifth switch 225 turns on and connects the first data signal line VSL1 and the second converter input 212, and in response to an active fourth switch signal S4 (not illustrated) the sixth switch 226 turns on and connects the second data signal line VSL2 and the first converter input 211. The fourth switch signal S4 and the third switch signal S3 may be identical.

The third switch 223, the fourth switch 224, the fifth switch 225, and the sixth switch 226 are controlled to apply a new pixel signal to one of the inputs of the differential analog-to-digital converter 213, while keeping the previous pixel signal on the other input of the differential analog-to-digital converter 213. Otherwise, the pixel response would be lost, because only the differential D/P coefficient DQ is proportional to the light intensity received by the pixel circuit 100.

Figure 7B:
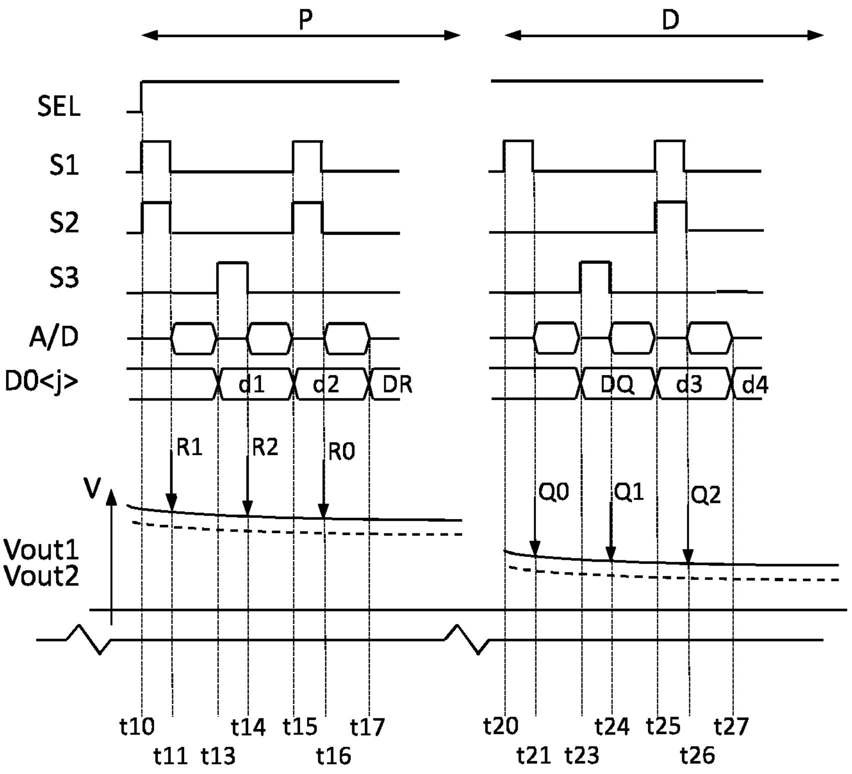
FIG. 7B is a simplified time diagram of various internal signals and output signals of the pixel circuit and the converter circuit of FIG. 7A.

The sensor controller 15 of the image sensor assembly 10 controls the reset signal RES, the transfer signal TG, the select signal SEL, the column select signal CEN, the first switch signal S1, the second switch signal S2, and the third switch signal S3 according to the timing scheme illustrated in FIG. 7B.

In particular, the sensor controller 15 may be configured to simultaneously turn on the third switch 223 and the fourth switch 224 while the fifth switch 225 and the sixth switch 226 are off, and to simultaneously turn on the fifth switch 225 and the sixth switch 226 while the third switch 223 and the fourth switch 224 are off in a preset phase.

The sensor controller 15 may also be configured to simultaneously turn on the third switch 223 and the fourth switch 224 while the fifth switch 225 and the sixth switch 226 are off, and to simultaneously turn on the fifth switch 225 and the sixth switch 226 while the third switch 223 and the fourth switch 224 are off in a main part of a data phase. In an initial part of the data phase, the sensor controller 15 may turn on only one of the third and fourth switches 223, 224 to obtain a differential D/P coefficient DQ.

FIG. 7B shows the timing of the select signal SEL, the first switch signal S1, the second switch signal S2, and the third switch signal S3, wherein the active signal level of a control signal is indicated by high level ("1") and the inactive signal level is indicated by low level ("0"). FIG. 7B shows further the time periods with active AD conversion (A/D) and the time periods in which differential coefficients D0<j> are available at a digital output of the differential analog-to-digital converter 213.

The timing diagram includes a preset phase P starting from t=t10 and a data phase D starting form t=t20 as described with reference to FIG. 6B The diagram for the pixel signals Vout1, Vout2 schematically indicates two different voltage levels for the first and second pixel output signals, wherein the continuous line refers to the first pixel signal Vout1 on the first data signal line VSL1 and the broken line refers to the second pixel signal Vout2 on the second data signal line VSL2.

At t=t10 in the preset phase P, the select signal SEL becomes active such that the selected pixel circuit 100 outputs the first pixel signal Vout1 on the first data signal line VSL1 and the second pixel signal Vout2 on the second data signal line VSL2. Also at t=t10 or later, the first and second switch signals S1, S2 become active until t=t11, whereas the third switch signal S3 remains inactive. The first pixel signal Vout1 is passed to the first converter input 211 and held, and the second pixel signal Vout2 is passed to the second converter input 212 and held. Between t=t11 and t=t13, the differential analog-to-digital converter 213 takes a first regular noise sample R1 by converting the difference between the two signals applied to the first and second converter inputs 211, 212 into a first differential coefficient d1.

At t=t13, the third switch signal S3 becomes active until t=t14, whereas the first switch signal S1 and the second switch signal S2 remain inactive. The instantaneous first pixel signal Vout1 is passed to the second converter input 212, and the instantaneous second pixel signal Vout2 is passed to the first converter input 211. Between t=t14 and t=t15, the differential analog-to-digital converter 213 takes a second regular noise sample R2 by converting the difference between the two signals applied to the first and second converter inputs 211, 212 into a second differential coefficient d2. Also between t=t13 and t=t15, the sensor controller 15 may control the differential analog-to-digital converter 213 to output the previously obtained noise coefficient d1.

At t=t15, the first switch signal S1 and the second switch signal S2 become active until t=t16, whereas the third switch signal S3 remains inactive. The first pixel signal Vout1 is passed to the first converter input 211 and the second pixel signal Vout2 is passed to the second converter input 212. Between t=t16 and t=t17, the differential analog-to-digital converter 213 takes a third regular noise sample R0 by converting the difference between the two signals applied to the first and second converter inputs 211, 212 into a noise coefficient DR.

In addition, the sensor controller 15 may control the differential analog-to-digital converter 213 to output the previously obtained second differential coefficient d2 between t=t15 and t=t17, and may control the differential analog-to-digital converter 213 to output the noise coefficient DR starting from t=t17.

Prior to t=t15, an even number of further digital temporal noise coefficients may be obtained in the same way as the first and second differential coefficients d1, d2, wherein the first pixel signals Vout1 are alternately passed to the first converter input 211 and the second converter input 212, and the second pixel signals Vout2 are alternately passed to the second converter input 212 and the first converter input 211.

Prior to t=t20 at the start of the data phase D, an active transfer signal TG connects the cathode of the photoelectric conversion device PD of the pixel circuit 100 of FIG. 7A with the floating diffusion FD. The floating diffusion potential Vfd decreases and the pixel circuit 100 output first and second pixel signals Vout1, Vout2 with typically lower voltage levels than in the preset phase P on the first and second data signal lines VSL1, VSL2.

Also at t=t20 or later, the first switch signal S1 becomes active until t=t11, whereas the second switch signal S2 and the third switch signal S3 remain inactive. The instantaneous first pixel signal Vout1 is passed to the first converter input 211, whereas the previous instance of the second pixel signal Vout2 obtained in the preset phase P is still held at the second converter input 212. Between t=t21 and t=t23, the differential analog-to-digital converter 213 takes a differential D/P sample Q0 by converting the difference between the two signals applied to the first and second converter inputs 211, 212 into a differential D/P coefficient DQ.

At t=t23, the third switch signal S3 becomes active until t=t24, whereas the first switch signal S1 and the second switch signal S2 remain inactive. The instantaneous first pixel signal Vout1 is passed to the second converter input 212, and the instantaneous second pixel signal Vout2 is passed to the first converter input 211. Between t=t24 and t=t25, the differential analog-to-digital converter 213 takes a first regular data sample Q1 by converting the difference between the two signals applied to the first and second converter inputs 211, 212 into a third differential coefficient d3. Also between t=23 and t=t25, the sensor controller 15 may control the differential analog-to-digital converter 213 to output the previously obtained differential D/P coefficient DQ.

At t=t25, the first switch signal S1 and the second switch signal S2 become active until t=t26, whereas the third switch signal S3 remains inactive. The first pixel signal Vout1 is passed to the first converter input 211 and the second pixel signal Vout2 is passed to the second converter input 212. Between t=t26 and t=t27, the differential analog-to-digital converter 213 takes a second regular data sample Q2 by converting the difference between the two signals applied to the first and second converter inputs 211, 212 into a fourth differential coefficient d4.

In addition, the sensor controller 15 may control the differential analog-to-digital converter 213 to output the previously obtained third differential coefficient d3 between t=t25 and t=t27.

Further digital differential coefficients may be obtained in the same way, wherein the first pixel signals Vout1 are alternately passed to the first converter input 211 and the second converter input 212, and the second pixel signals Vout2 are alternately passed to the second converter input 212 and the first converter input 211.

For each differential coefficient d1, d2, d3, . . . , the connection of the data signal lines VSL and VSL to the inputs of the differential analog-to-digital converter 213 alternate. Accordingly, an even number of differential coefficients d1, d2 is obtained for each of the preset phase P and the data phase D. On the other hand, the connection polarity for obtaining the noise coefficient DR is the same as for obtaining the differential D/P coefficient DQ such that CDS removes the offset in the analog chain. In the rest, the noise coefficient DR is obtained in the same way as the differential coefficients d1, d2 in the preset phase P ("noise coefficients").

Table 2 gives an overview of the pixel signals, the comparator inputs and the digital coefficients obtained at the various samples, wherein the first comparator input is the positive input + and the second comparator input is the negative input − of the differential analog-to-digital converter 213 of FIG. 7A. VRA indicates an instance of the first pixel signal Vout1 in the preset phase. VRB indicates an instance of the second pixel signal Vout2 in the preset phase. VQA indicates an instance of the first pixel signal Vout1 in the data phase. VQB indicates an instance of the second pixel signal Vout2 in the data phase.

TABLE 2

| Sample | R1 | R2 | . . . R0 | Q0 | Q1 | Q2 | . . . |
|---|---|---|---|---|---|---|---|
| + | $V_{RA}$ | $V_{RB}$ | . . . $V_{RA}$ | $V_{QA}$ | $V_{QB}$ | $V_{QA}$ | . . . |
| − | $V_{RB}$ | $V_{RA}$ | . . . $V_{RB}$ | $V_{RB}$ | $V_{QA}$ | $V_{QB}$ | . . . |
| D0<j> | d1 | d2 | . . . DR | DQ | d3 | d4 | . . . |

The method includes a digital correlated double sampling concerning $V_Q$ and $V_R$, and a digital correlated multiple sampling with alternating sign for both $V_Q$ and $V_R$ according to equations #4 and #5:

$$\sum_{n=1}^{N}(-1)^{n+1}V_R(nT_0) \qquad \#4$$

$$\sum_{n=1}^{N}(-1)^{n+1}V_Q(nT_0) \qquad \#5$$

The digital value $D_{CDS}$ for a data signal can be calculated according to equation #6:

$$D_{CDS}=D_Q-D_R+\sum_{n=1}^{2N}(-1)^n d_n \qquad \#6$$

If the third switch signal S3 controls only the fifth switch 225 and a fourth switch signal S4 (not illustrated) controls the sixth switch 226, and the timings for the fourth switch signal S4 (not illustrated) and the third switch signal S3 are identical, the timings for the first switch signal S1 and the second switch signal S2 on one side and for the third switch signal S3 and the fourth switch signal S4 on the other side may be swapped regularly or randomly row-by-row. In particular, such swapping of the timing for the first switch signal S1 and the second switch signal S2 on one side and the timing for the third switch signal S3 and the fourth switch signal S4 on the other side enables the connections of the first data signal line VSL1 and the second data signal line VSL2 to the differential analog-to-digital converter 213 to be alternated in a random row-by-row manner and to break up any second-order vertical line patterns.

To this end, the sensor controller 15 generates an internal first switch signal iS1 with the timing of the first switch signal S1 illustrated in FIG. 7B, an internal second signal iS2 with the timing of the second switch signal S2 illustrated in FIG. 7B, an internal third switch signal iS3 with the timing of the third switch signal S3 illustrated in FIG. 7B, and an internal fourth switch signal iS4 having active pulses in the same time intervals as the third switch signal S3 illustrated in FIG. 7B.

The sensor controller 15 further includes an internal multiplexer with four signal inputs receiving the four internal switch signals, a first output outputting the first switch signal S1, a second output outputting the second switch signal S2, a third output outputting the third switch signal S3, a fourth output outputting the fourth switch signal S4, and a control input to change the state of the internal multiplexer between a first state and a second state. In the first state, the internal multiplexer connects the first signal input receiving the internal first switch signal iS1 with the first output, the second signal input receiving the internal second switch signal iS2 with the second output, the third signal input receiving the internal third switch signal iS3 with the third output, and the fourth signal input receiving the internal fourth switch signal iS4 with the fourth output. In the second state, the internal multiplexer connects the first signal input receiving the internal first switch signal iS1 with the third output, the second signal input receiving the internal second switch signal iS2 with the fourth output, the third signal input receiving the internal third switch signal iS3 with the first output, and the fourth signal input receiving the internal fourth switch signal iS4 with the second output. The states of the internal multiplexer may be controlled per pixel row according to a random sequence.

FIG. 8A refers to an embodiment with the first and second amplification transistors 103, 113 and the first and second selection transistor 108, 118 included in different pixel circuits 100.

In particular, a gate of the first amplification transistor 103 and a gate of the second amplification transistor 113 are electrically disconnected. A first floating diffusion potential of a first floating diffusion FD1 is applied to the gate of the first amplification transistor 103. A second floating diffusion potential of a second floating diffusion FD2 is applied to the gate of the second amplification transistor 113.

The first amplification transistor 103 is part of a first pixel circuit 100 that further includes the first selection transistor 108, a first reset transistor 102, and a first transfer transistor 101. The second amplification transistor 113 is part of a second pixel circuit 110 that further includes a second selection transistor 118, a second reset transistor 112, and a second transfer transistor 111.

The first and second pixel circuits 100, 110 have the same configuration, the same radiation sensitivity and the same electrical target characteristics. A gate of the first selection transistor 108 and a gate of the second selection transistor 118 may be connected to the same select line and are controlled through the same select signal SEL. The same reset signal RES may control the first reset transistor 102 and the second reset transistor 112. A first transfer signal TG1 may control the first transfer transistor 101. A second transfer signal TG2 may control the second transfer transistor 111. The first and second pixel circuits 100, 110 may be in different pixel rows or in the same pixel row, wherein the first and second transfer signals TG1, TG2 may be transmitted over two different transfer lines.

The load path of the first selection transistor 108 is connected through a first pixel output 109 of the first pixel circuit 100 to a first data signal line VSL1. The load path of the second selection transistor 118 is connected through a second pixel output 119 of the second pixel circuit 110 to a second data signal line VSL2.

The first data signal line VSL1 passes first pixel signals Vout1 output by the first pixel circuit 100 to an ADC unit 220. The second data signal line VSL2 passes second pixel signals Vout2 output by the second pixel circuit 110 to the same ADC unit 220. The ADC unit 200 may have a similar hardware configuration for the switch assembly 220 and the converter circuit 210 as the ADC unit 200 in FIG. 7A.

In particular, the ADC unit 200 may include a switching assembly 200 that includes a third switch 223 connected between the first data signal line VSL1 and the first converter input 211, a fourth switch 224 connected between the second data signal line VSL2 and the second converter input 212, a fifth switch 225 connected between the first data signal line VSL1 and the second converter input 212, and a sixth switch 226 connected between the second data signal line VSL2 and the first converter input 211.

In addition, the switching assembly 200 includes a seventh switch 227 connected directly between the first converter input 211 and the second converter input 212. The seventh switch 227 is in close proximity to the differential analog-to-digital converter 213, with no further electrical elements connected between a first side of the seventh switch 227 and the first converter input 211 and with no further electrical elements connected between a second side of the seventh switch 227 and the second converter input.

A first switch signal S1 controls the third switch 223 and the fourth switch 224. In response to an active first switch signal S1, the third switch 223 turns on and connects the first converter input 211 and the first data signal line VSL1 and the fourth switch 224 turns on and connects the second converter input 212 and the second data signal line VSL2.

A second switch signal S2 controls the fifth switch 225 and the sixth switch 226. In response to an active second switch signal S2, the fifth switch 225 turns on and connects the second converter input 212 and the first data signal line VSL1 and the sixth switch 226 turns on and connects the first converter input 211 and the second data signal line VSL2.

A third switch signal S3 controls the seventh switch 227. In response to an active third switch signal S3, the seventh switch 227 turns on and directly connects the first converter input 211 and the second converter input 212.

Figure 8B:
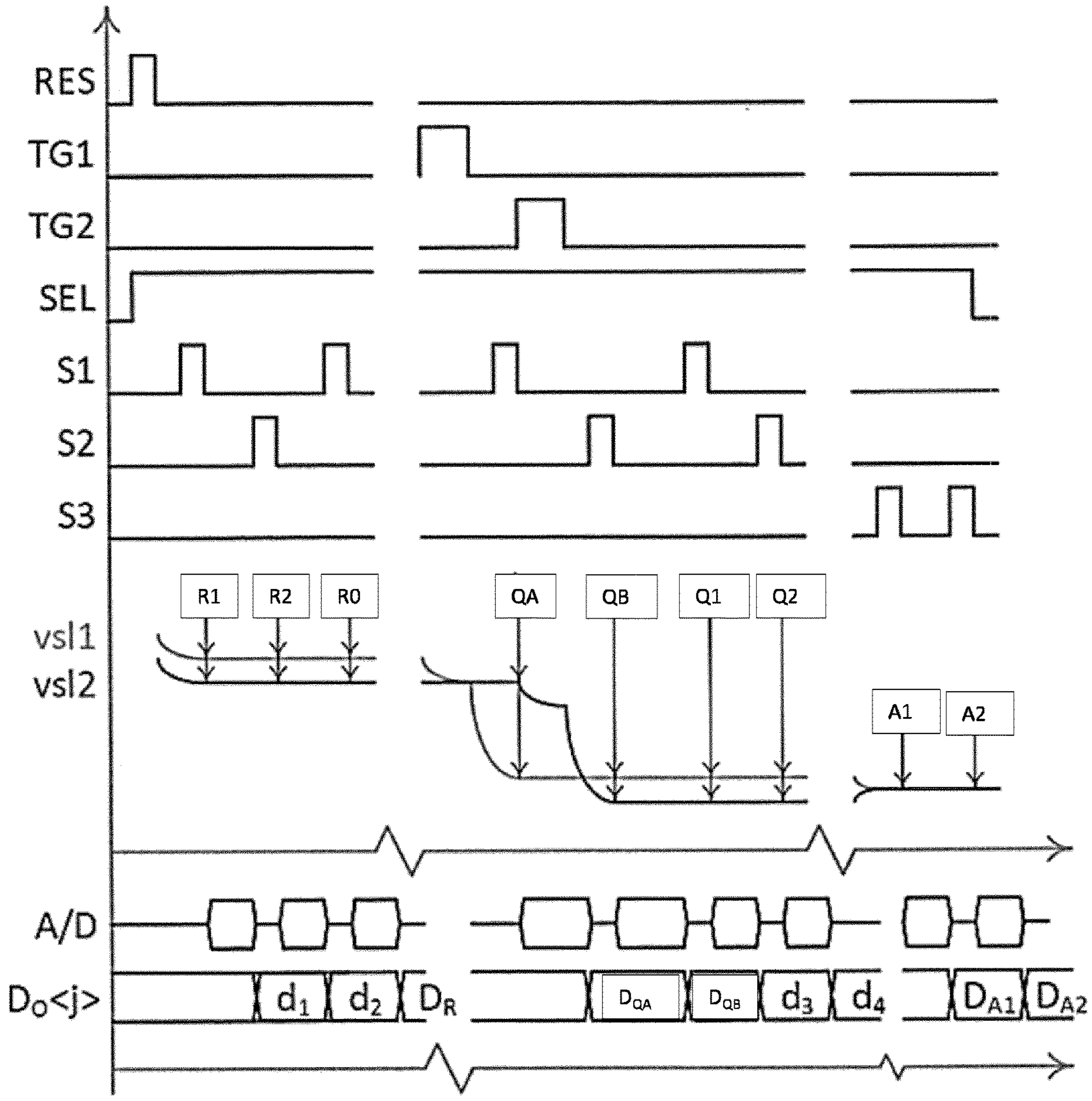
FIG. 8B is a simplified time diagram of various internal signals and output signals of the pixel circuits and the converter circuit of FIG. 8A.

The sensor controller 15 of the image sensor assembly 10 controls the reset signal RES, the transfer signal TG, the select signal SEL, the column select signal CEN, the first switch signal S1, the second switch signal S2, and the third switch signal S3 according to the timing scheme illustrated in FIG. 8B.

In particular, the sensor controller 15 may be configured to simultaneously turn on the third switch 223 and the fourth switch 224 while the fifth switch 225 and the sixth switch 226 are off, and to simultaneously turn on the fifth switch 225 and the sixth switch 226 while the third switch 223 and the fourth switch 224 are off in a preset phase.

The sensor controller 15 may also be configured to simultaneously turn on the third switch 223 and the fourth switch 224 while the fifth switch 225 and the sixth switch 226 are off, and to simultaneously turn on the fifth switch 225 and the sixth switch 226 while the third switch 223 and the fourth switch 224 are off in a main part of a data phase.

In an initial part of the data phase, the sensor controller 15 may turn on only one of the third and fourth switches 223, 224 to obtain a differential D/P coefficient DQ.

FIG. 8B shows the timing of the rest signal RES, the first transfer signal TG1, the second transfer signal TG2, the select signal SEL, the first switch signal S1, the second switch signal S2, and the third switch signal S3, wherein the active signal level of a control signal is indicated by high level ("1") and the inactive signal level is indicated by low level ("0"). FIG. 8B shows further the time periods with active AD conversion (A/D) and the time periods in which digital coefficients D0<j> are available at a digital output of the differential analog-to-digital converter 213.

Obtaining the noise coefficient DR and the first differential coefficients d1, d2 in the preset phase P may follow the pattern discussed with reference to FIG. 7B.

During the data phase, the first transfer signal TG1 is active prior to the second transfer signal TG2. By comparing a data signal instance of the first pixel signal Vout1 with a noise signal instance of the second pixel signal Vout2, the differential analog-to-digital converter 213 takes a differential D/P sample QA by converting the difference between the two signals applied to the first and second converter inputs 211, 212 into a differential D/P coefficient DQA.

After activating the second transfer signal TG2, by comparing a data signal instance of the first pixel signal Vout1 with a data signal instance of the second pixel signal Vout2, the differential analog-to-digital converter 213 takes a differential D/D sample QB by converting the difference between the two signals applied to the first and second converter inputs 211, 212 into a differential D/D coefficient DQB. Obtaining further differential coefficients d3, d4 in the data phase D may follow the pattern discussed with reference to FIG. 7B.

In an autozero phase A, the third switch signal S3 directly connects the first and second converter inputs 211, 212. By determining the result of the differential AD conversion with directly connected first and second converter inputs 211, 212, the differential analog-to-digital converter 213 takes offset samples A1, A2 by converting a residual difference between the two signals applied to the first and second converter inputs 211, 212 into offset coefficients DA1, DA2.

Table 3 gives an overview of the pixel signals, the comparator inputs and the digital coefficients obtained at the various samples, wherein the first comparator input is the positive input + and the second comparator input is the negative input − of the differential analog-to-digital converter 213 of FIG. 7A. VRA indicates an instance of the first pixel signal Vout1 in the preset phase. VRB indicates an instance of the second pixel signal Vout2 in the preset phase. VQA indicates an instance of the first pixel signal Vout1 in the data phase. VQB indicates an instance of the second pixel signal Vout2 in the data phase.

TABLE 3

| Sample | R1 | R2 | . . . | R0 | QA | QB | Q3 | Q4 | . . . | A1 | A2 |
|---|---|---|---|---|---|---|---|---|---|---|---|
| + | $V_{RA}$ | $V_{RB}$ | . . . | $V_{RA}$ | $V_{QA}$ | $V_{QB}$ | $V_{QA}$ | $V_{QB}$ | . . . | $V_{OA}$ | $V_{OB}$ |
| − | $V_{RB}$ | $V_{RA}$ | . . . | $V_{RB}$ | $V_{RB}$ | $V_{QA}$ | $V_{QB}$ | $V_{QA}$ | . . . | $V_{OB}$ | $V_{OA}$ |
| D0<j> | d1 | d2 | . . . | DR | DQA | DQB | d3 | d4 | . . . | DA1 | DA2 |

The method includes a digital correlated double sampling concerning $V_Q$ and $V_R$, and a digital correlated multiple sampling with alternating sign for both $V_Q$ and $V_R$ according to equations #7 and #8:

$$\sum_{n=1}^{N}(-1)^{n+1}V_R(nT_0) \qquad \#7$$

$$\sum_{n=1}^{N}(-1)^{n+1}V_Q(nT_0) \qquad \#8$$

In addition, the method provides a per frame ADC offset measurement according to equation #9:

$$D_A = \frac{1}{N}\sum_{n=1}^{N}D_{An} \qquad \#9$$

The digital value $D_{CDS}$ for a data signal can be calculated according to equations #10, #11, and #12:

$$D_N = -\sum_{n=1}^{N}d_n + \sum_{n=N+1}^{2N}d_n \qquad \#10$$

$$D_{CDS,j} = D_{SA} - D_R + D_N \qquad \#11$$

$$D_{CDS,j-1} = D_{QA} + D_{QB} - D_R - D_A + D_N \qquad \#12$$

Figure 9:
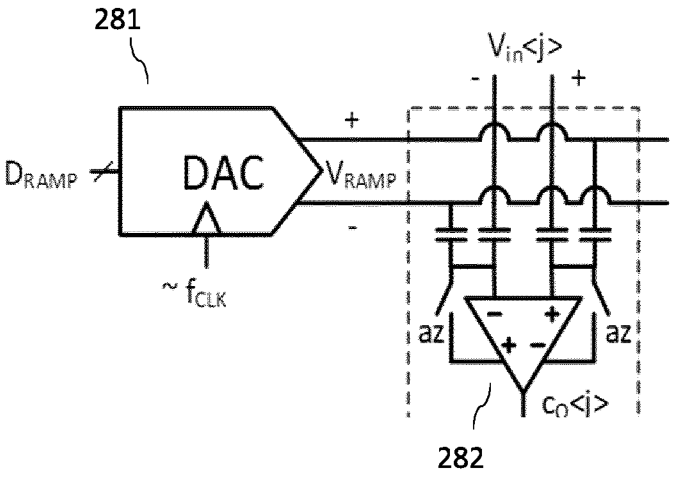
FIG. 9 is a simplified circuit diagram of a converter circuit with differential comparator according to an embodiment.

FIG. 9 shows an alternative configuration of a converter circuit 210 including a digital-to-analog converter 281 that supplies two complementary voltage ramps to a dual-slope differential analog-to-digital converter 282. Alternatively, the converter circuit 210 may include a differential analog-to-digital converter based on SAR (successive approximation register), sigma-delta conversion, or cyclic conversion.

Figure 10:
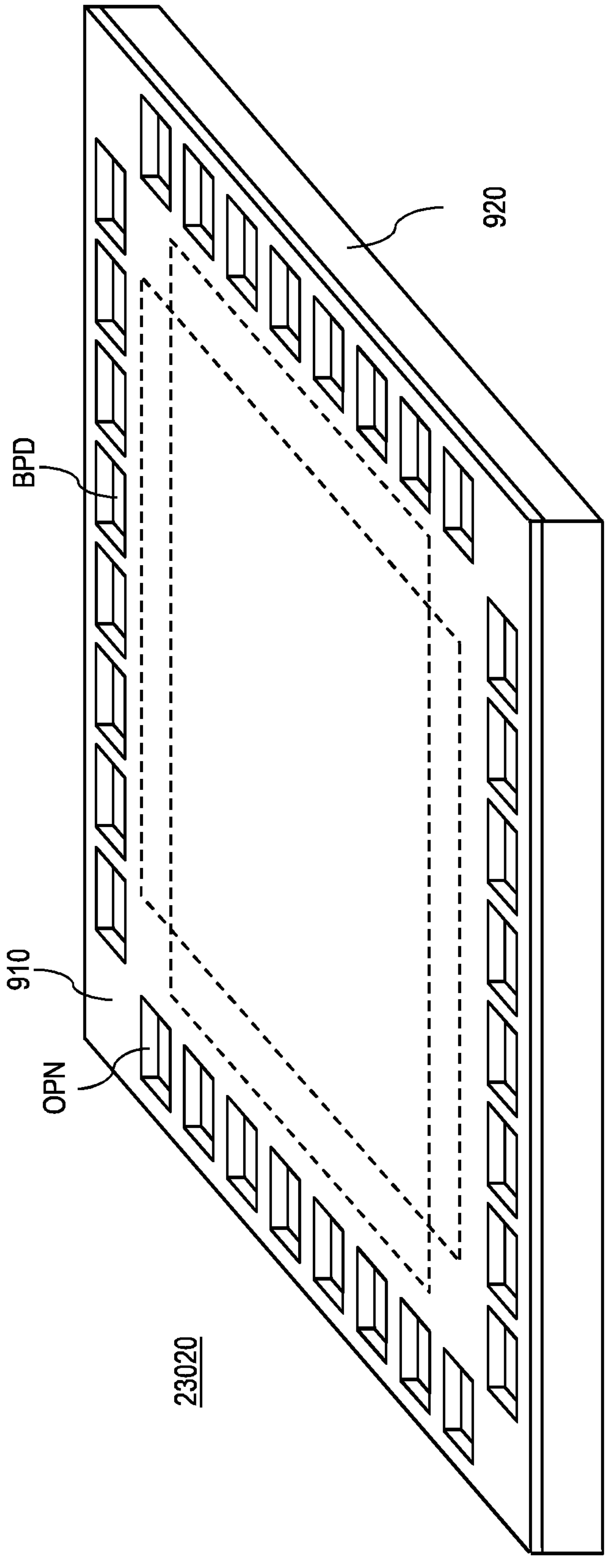
FIG. 10 is a diagram showing an example of a laminated structure of a solid-state imaging device according to an embodiment of the present disclosure.

FIG. 10 is a perspective view showing an example of a laminated structure of a solid-state imaging device 23020 with a plurality of pixel circuits arranged matrix-like in array form. Each pixel circuit includes at least one photoelectric conversion element.

The solid-state imaging device 23020 has the laminated structure of a first chip (upper chip) 910 and a second chip (lower chip) 920. The laminated first and second chips 910, 920 may be electrically connected to each other through TC(S)Vs (Through Contact (Silicon) Vias) formed in the first chip 910. The solid-state imaging device 23020 may be formed to have the laminated structure in such a manner that the first and second chips 910 and 920 are bonded together at wafer level and cut out by dicing.

In the laminated structure of the upper and lower two chips, the first chip 910 may be an analog chip (sensor chip) including at least one analog component of each pixel circuit, e.g., the photoelectric conversion devices arranged in array form.

For example, the first chip 910 may include only the photoelectric conversion devices of the pixel circuits as described above with reference to the preceding FIGS. Alternatively, the first chip 910 may include further elements of each pixel circuit. For example, the first chip 910 may include, in addition to the photoelectric conversion elements, at least the transfer transistor, the reset transistor, the amplification transistor, and/or the selection transistor of the pixel circuits. Alternatively, the first chip 910 may include each element of the pixel circuit. In addition to the elements of the pixel circuits, the first chip 910 may include one, some or all elements of the ADC units, e.g., some or all elements of the converter circuit, the constant current circuit and/or the switching assembly as described above.

The second chip 920 may be mainly a logic chip (digital chip) that includes the elements complementing the elements on the first chip 910 to complete pixel circuits and/or the ADC units. The second chip 920 may also include analog circuits, for example circuits that quantize analog signals transferred from the first chip 910 through the TCVs. For example, the second chip 920 may include all or at least some of the components of the ADC units as described with reference to the preceding Figures.

The second chip 920 may have one or more bonding pads BPD and the first chip 910 may have openings OPN for use in wire-bonding to the second chip 920. The solid-state imaging device 23020 with the laminated structure of the two chips 910, 920 may have the following characteristic configuration:

The electrical connection between the first chip 910 and the second chip 920 is performed through, for example, the TCVs. The TCVs may be arranged at chip ends or between a pad region and a circuit region. The TCVs for transmitting control signals and supplying power may be mainly concentrated at, for example, the four corners of the solid-state imaging device 23020, by which a signal wiring area of the first chip 910 can be reduced.

The technology according to the present disclosure may be realized in a light receiving device mounted in a mobile body of any type such as automobile, electric vehicle, hybrid electric vehicle, motorcycle, bicycle, personal mobility, airplane, drone, ship, or robot.

Figure 11:
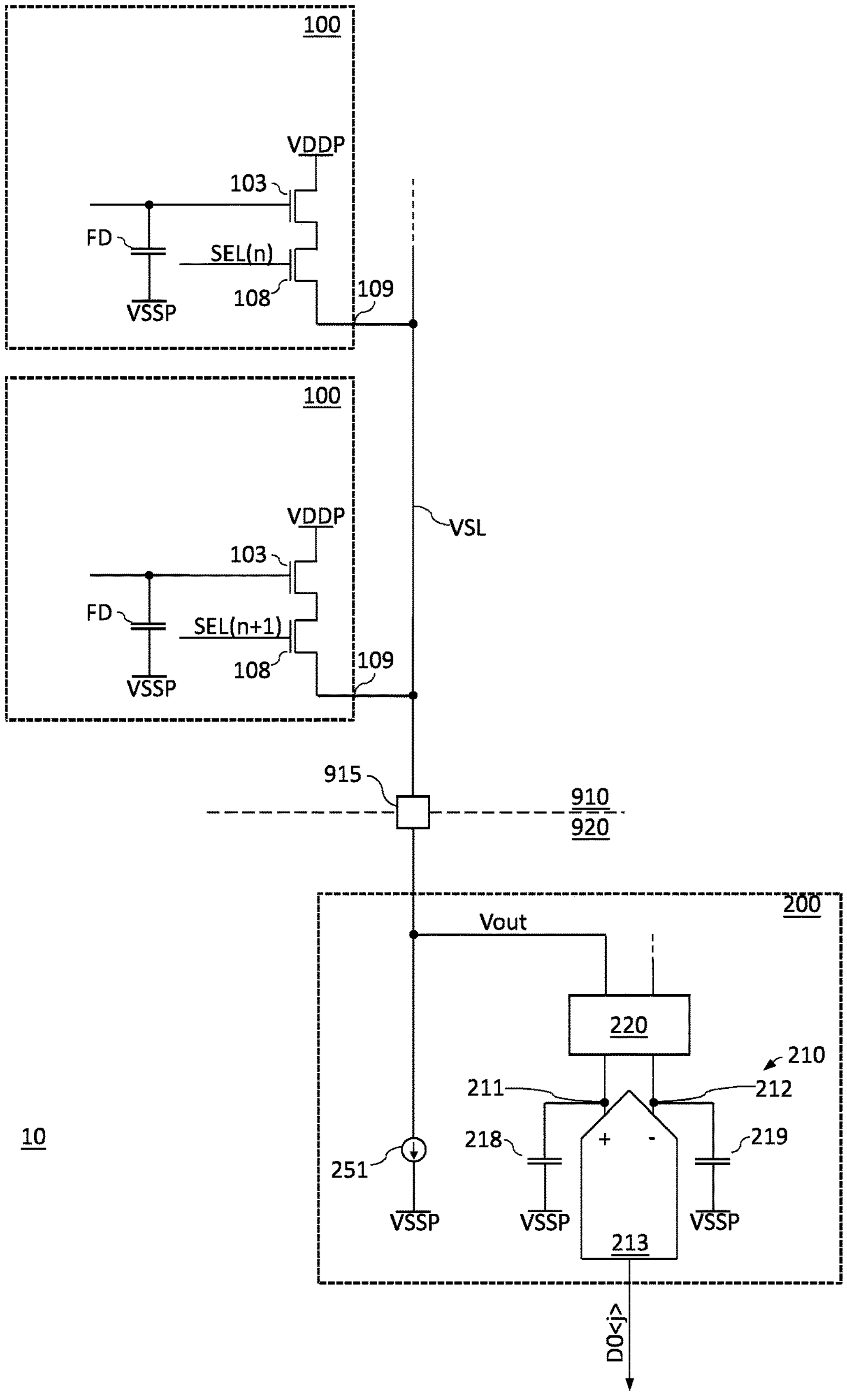
FIG. 11 is a schematic circuit diagram of elements of an image sensor assembly formed on a first chip and a second chip of a solid-state imaging device with laminated structure according to an embodiment.

FIG. 11 shows a possible allocation of elements of an image sensor assembly 10 across the first chip 910 and the second chip 920 of FIG. 10.

The first chip 910 may include the pixel circuits 100 with the photoelectric conversion devices PD. The second chip 920 may include inter alia ADC units 200 with the constant current circuit 251. One through contact via 915 per data signal line VSL passes the pixel signal Vout from the first chip 910 to the second chip 920.

Figure 12:
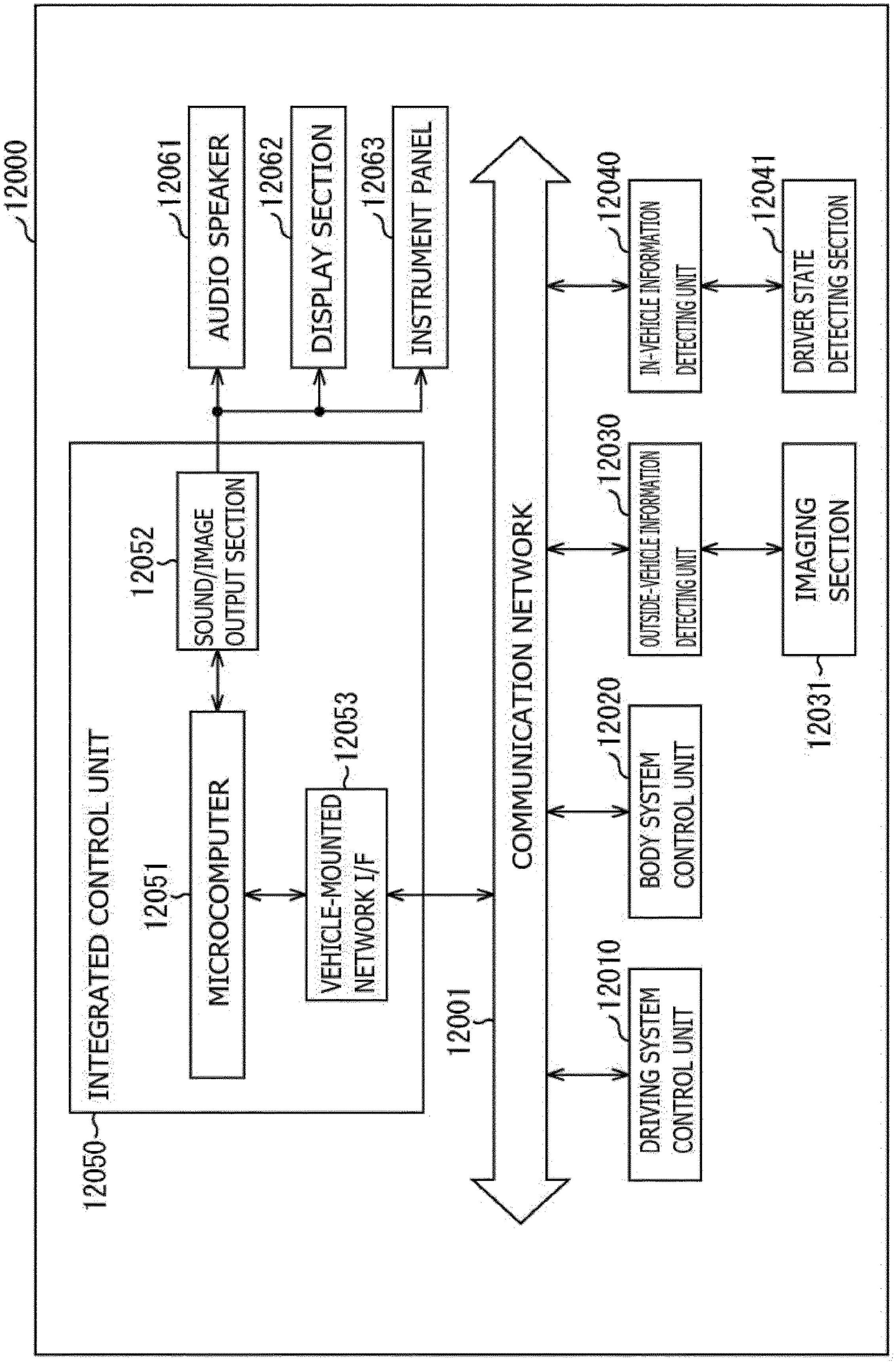
FIG. 12 is a block diagram depicting an example of a schematic configuration of a vehicle control system.

FIG. 12 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 12, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 imaging an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 may be or may include an image sensor assembly that includes ADC units with converter circuits according to the embodiments of the present disclosure. The light received by the imaging section 12031 may be visible light, or may be invisible light such as infrared rays or the like.

The in-vehicle information detecting unit 12040 detects information about the inside of the vehicle and may be or may include a solid-state imaging device with a raw driver assembly according to the embodiments of the present disclosure. The in-vehicle information detecting unit 12040 is, for example, connected with a driver state detecting section 12041 that detects the state of a driver. The driver state detecting section 12041, for example, includes a camera that includes the solid-state imaging device and that is focused on the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound or an image to an output device capable of visually or audible notifying information to an occupant of the vehicle or the outside of the vehicle. In the example of FIG. 12, an audio speaker 12061, a display section 12062, and an instrument panel 12063 are illustrated as the output device. The display section 12062 may, for example, include at least one of an on-board display or a head-up display, wherein each of them may include a solid-state imaging device with a comparing circuit as described with reference to the preceding Figures.

Figure 13:
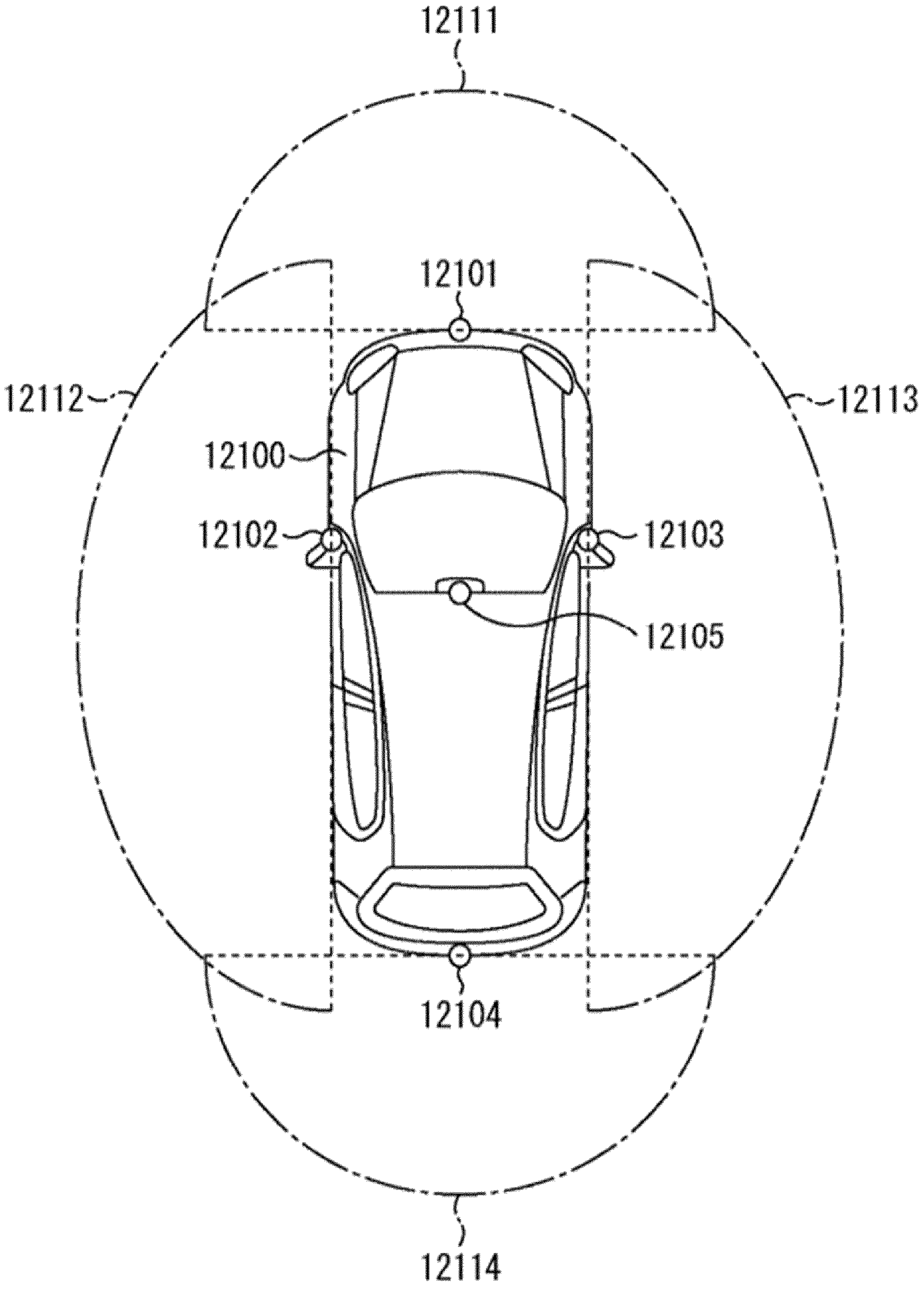
FIG. 13 is a diagram of assistance in explaining an example of installation positions of an outside-vehicle information detecting section and an imaging section of the vehicle control system of FIG. 12.

FIG. 13 is a diagram depicting an example of the installation position of the imaging section 12031, wherein the imaging section 12031 may include imaging sections 12101, 12102, 12103, 12109, and 12105.

The imaging sections 12101, 12102, 12103, 12109, and 12105 are, for example, disposed at positions on a front nose, side-view mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the side view mirrors obtain mainly an image of the sides of the vehicle 12100. The imaging section 12109 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 13 depicts an example of photographing ranges of the imaging sections 12101 to 12109. An imaging range 12111 represents the imaging range of the imaging section 12101 provided to the front nose. Imaging ranges 12112 and 12113 respectively represent the imaging ranges of the imaging sections 12102 and 12103 provided to the side view mirrors. An imaging range 12114 represents the imaging range of the imaging section 12109 provided to the rear bumper or the back door. A bird's-eye image of the vehicle 12100 as viewed from above is obtained by superimposing image data imaged by the imaging sections 12101 to 12109, for example.

At least one of the imaging sections 12101 to 12109 may have a function of obtaining distance information. For example, at least one of the imaging sections 12101 to 12109 may be a stereo camera constituted of a plurality of imaging elements, imaging element having pixels for phase difference detection or may include a ToF module including a high dynamic range image sensor that includes an ADC unit with a converter circuit according to the present disclosure.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12109, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12109, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12109 may be an infrared camera that detects infrared rays. The microcomputer 12051 can, for example, recognize a pedestrian by determining whether or not there is a pedestrian in imaged images of the imaging sections 12101 to 12109. Such recognition of a pedestrian is, for example, performed by a procedure of extracting characteristic points in the imaged images of the imaging sections 12101 to 12109 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12109, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above. By applying an image sensor that includes an ADC unit with a converter circuit according to the present disclosure, SNR can be further improved.

Additionally, embodiments of the present technology are not limited to the above-described embodiments, but various changes can be made within the scope of the present technology without departing from the gist of the present technology.

A solid-state imaging device including an image sensor array that includes ADC units with a converter circuit according to the present disclosure may be any device used for analyzing and/or processing radiation such as visible light, infrared light, ultraviolet light, and X-rays. For example, the solid-state imaging device may be any electronic device in the field of traffic, the field of home appliances, the field of medical and healthcare, the field of security, the field of beauty, the field of sports, the field of agriculture, the field of image reproduction or the like.

Specifically, in the field of image reproduction, the solid-state imaging device may be a device for capturing an image to be provided for appreciation, such as a digital camera, a smart phone, or a mobile phone device having a camera function. In the field of traffic, for example, the solid-state imaging device may be integrated in an in-vehicle sensor that captures the front, rear, peripheries, an interior of the vehicle, etc. for safe driving such as automatic stop, recognition of a state of a driver, or the like, in a monitoring camera that monitors traveling vehicles and roads, or in a distance measuring sensor that measures a distance between vehicles or the like.

In the field of home appliances, the solid-state imaging device may be integrated in any type of sensor that can be used in devices provided for home appliances such as TV receivers, refrigerators, and air conditioners to capture gestures of users and perform device operations according to the gestures. Accordingly the solid-state imaging device may be integrated in home appliances such as TV receivers, refrigerators, and air conditioners and/or in devices controlling the home appliances. Furthermore, in the field of medical and healthcare, the solid-state imaging device may be integrated in any type of sensor, e.g. a solid-state image device, provided for use in medical and healthcare, such as an endoscope or a device that performs angiography by receiving infrared light.

In the field of security, the solid-state imaging device can be integrated in a device provided for use in security, such as a monitoring camera for crime prevention or a camera for person authentication use. Furthermore, in the field of beauty, the solid-state imaging device can be used in a device provided for use in beauty, such as a skin measuring instrument that captures skin or a microscope that captures a probe. In the field of sports, the solid-state imaging device can be integrated in a device provided for use in sports, such as an action camera or a wearable camera for sport use or the like. Furthermore, in the field of agriculture, the solid-state imaging device can be used in a device provided for use in agriculture, such as a camera for monitoring the condition of fields and crops.

The present technology can also be configured as described below:

(1) An image sensor assembly including a pixel circuit that includes a first amplification transistor and a first selection transistor, wherein the first amplification transistor and the first selection transistor are electrically connected in series and are configured to output first pixel signals at a first pixel output, if the first selection transistor is turned on; and a converter circuit configured to receive the first pixel signals from the first selection transistor and to receive second pixel signals from the first selection transistor or from a second selection transistor, and to convert voltage differences between the first pixel signals and the second pixel signals into digital coefficients.

(2) The image sensor assembly according to (1), wherein the converter circuit includes a differential analog-to-digital converter configured to convert differential input signals applied between a first converter input and a second converter input into the digital coefficients, and wherein each differential input signal results from applying one of the first pixel signals to the first converter input and from applying one of the second pixel signals to the second converter input.

(3) The image sensor assembly according to any of (1) and (2), further including a switching assembly configured to connect the first converter input with the first pixel output and to disconnect the second converter input from the first pixel output in a first operational state, and to disconnect the first converter input from the first pixel output and to connect the second converter input to the first pixel output in a second operational state.

(4) The image sensor assembly according to any of (1) to (3), further including a switching assembly configured to successively pass a first pixel signal and/or a second pixel signal of the first and second pixel signals to each of the first converter input and the second converter input.

(5) The image sensor assembly according to any of (1) to (4), wherein the converter circuit is configured to successively receive the at least one first pixel signal and the at least one second pixel signal from the first pixel output, and to store the at least one first pixel signal until the at least one second pixel signal is received and/or to store the at least one first pixel signal until the at least one second pixel signal is received.

(6) The image sensor assembly according to (5), further including a first switch connected between the data signal line and the first converter input and a second switch connected between the data signal line and the second converter input.

(7) The image sensor assembly according to any of (1) to (4), further including a second amplification transistor and a second selection transistor electrically connected in series and configured to output the second pixel signals at a second pixel output, when the second selection transistor is on.

(8) The image sensor assembly according to (7), wherein the first amplification transistor and the second amplification transistor have a same threshold voltage.

(9) The image sensor assembly according to any of (7) and (8), wherein a gate of the first selection transistor and a gate of the second selection transistor are connected, wherein the first pixel output is connected to a first data signal line, and wherein the second pixel output is connected to a second data signal line.

(10) The image sensor assembly according to any of (7) to (9), wherein a gate of the first amplification transistor and a gate of the second amplification transistor are electrically connected.

(11) The image sensor assembly according to any of (7) to (10), further including a third switch connected between the first data signal line and the first converter input, a fourth switch connected between the second data signal line and the second converter input, a fifth switch connected between the first data signal line and the second converter input, and a sixth switch connected between the second data signal line and the first converter input.

(12) The image sensor assembly according to (11), further including a sensor controller configured to simultaneously turn on the third switch and the fourth switch while the fifth switch and the sixth switch are off, and to simultaneously turn on the fifth switch and the sixth switch while the third switch and the fourth switch are off in a preset phase.

(13) The image sensor assembly according to any of (7) to (9), wherein a gate of the first amplification transistor and a gate of the second amplification transistor are electrically disconnected.

(14) The image sensor assembly according to any of (7) to (9) and (13), further including a seventh switch connected directly between the first converter input and the second converter input.

(15) The image sensor assembly according to any of (1) to (14), further including an evaluation unit configured to obtain a digital signal value on the basis of the digital coefficients.

The invention claimed is:

1. An image sensor assembly, comprising:

a pixel circuit comprising a first amplification transistor and a first selection transistor, wherein the first amplification transistor and the first selection transistor are electrically connected in series and are configured to output first pixel signals at a first pixel output, when the first selection transistor is turned on;

a second amplification transistor and a second selection transistor electrically connected in series and configured to output second pixel signals at a second pixel output, when the second selection transistor is turned on;

a first data signal line connected to the first pixel output and a second data signal line connected to the second pixel output; and a converter circuit configured to receive the first pixel signals from the first selection transistor and to receive second pixel signals from the second selection transistor, and to convert voltage differences between the first pixel signals and the second pixel signals into digital coefficients.

2. The image sensor assembly according to claim 1, wherein the converter circuit comprises a differential analog-to-digital converter configured to convert differential input signals applied between a first converter input and a second converter input into the digital coefficients, and wherein each differential input signal results from applying one of the first pixel signals to the first converter input and from applying one of the second pixel signals to the second converter input.

3. The image sensor assembly according to claim 1, further comprising:

a switching assembly configured to connect the first converter input with the first pixel output and to disconnect the second converter input from the first pixel output in a first operational state, and to disconnect the first converter input from the first pixel output and to connect the second converter input to the first pixel output in a second operational state.

4. The image sensor assembly according to claim 1, further comprising:

a switching assembly configured to successively pass a first pixel signal and/or a second pixel signal of the first and second pixel signals to each of the first converter input and the second converter input.

5. The image sensor assembly according to claim 1, wherein the converter circuit is configured to successively receive the at least one first pixel signal and the at least one second pixel signal from the first pixel output, and to store the at least one first pixel signal until the at least one second pixel signal is received and/or to store the at least one first pixel signal until the at least one second pixel signal is received.

6. The image sensor assembly according to claim 5, further comprising:

a first switch connected between the data signal line and the first converter input and a second switch connected between the data signal line and the second converter input.

7. The image sensor assembly according to claim 1, wherein the first amplification transistor and the second amplification transistor have a same threshold voltage.

8. The image sensor assembly according to claim 1, wherein a gate of the first selection transistor and a gate of the second selection transistor are connected, wherein the first pixel output is connected to a first data signal line, and wherein the second pixel output is connected to a second data signal line.

9. The image sensor assembly according to claim 1, wherein a gate of the first amplification transistor and a gate of the second amplification transistor are electrically connected.

10. The image sensor assembly according to claim 1, further comprising:

a third switch connected between the first data signal line and the first converter input, a fourth switch connected between the second data signal line and the second converter input, a fifth switch connected between the first data signal line and the second converter input, and a sixth switch connected between the second data signal line and the first converter input.

11. The image sensor assembly according to claim 10, further comprising:

a sensor controller configured to simultaneously turn on the third switch and the fourth switch while the fifth switch and the sixth switch are off, and to simultaneously turn on the fifth switch and the sixth switch while the third switch and the fourth switch are off in a preset phase.

12. The image sensor assembly according to claim 1, wherein a gate of the first amplification transistor and a gate of the second amplification transistor are electrically disconnected.

13. The image sensor assembly according to claim 1, further comprising:

a seventh switch connected directly between the first converter input and the second converter input.

14. The image sensor assembly according to claim 1, further comprising:

an evaluation unit configured to obtain a digital signal value on the basis of the digital coefficients.

15. The image sensor assembly according to claim 1, wherein the first selection transistor and the second selection transistor are controlled by a same selection signal such that the first pixel output simultaneously outputs the first pixel signals on the first data signal line and the second pixel output simultaneously outputs the second pixel signals on the second data signal line.

16. The image sensor assembly according to claim 1, further comprising:

a first transfer transistor configured to transfer charge to a first floating diffusion of the pixel circuit in response to a first transfer signal, the first amplification transistor having a gate connected to the first floating diffusion; and a second transfer transistor configured to transfer charge to a second floating diffusion of a second pixel circuit comprising the second amplification transistor and the second selection transistor, in response to a second transfer signal different from the first transfer signal, the second amplification transistor having a gate connected to the second floating diffusion.

17. The image sensor assembly according to claim 1, further comprising:

a first constant current circuit connected between the first data signal line and a supply voltage; and a second constant current circuit connected between the second data signal line and the supply voltage.

18. The image sensor assembly according to claim 1, further comprising:

a first column select switch connected to the first data signal line and configured to selectively connect and disconnect the first data signal line from the converter circuit; and a second column select switch connected to the second data signal line and configured to selectively connect and disconnect the second data signal line from the converter circuit.

19. An image sensor assembly, comprising:

a pixel circuit comprising a first amplification transistor and a first selection transistor, wherein the first amplification transistor and the first selection transistor are electrically connected in series and are configured to output first pixel signals at a first pixel output, when the first selection transistor is turned on;

a second amplification transistor and a second selection transistor electrically connected in series and configured to output second pixel signals at a second pixel output, when the second selection transistor is turned on;

a first data signal line connected to the first pixel output and a second data signal line connected to the second pixel output;

a converter circuit comprising a first converter input and a second converter input, configured to receive the first pixel signals from the first selection transistor and to receive the second pixel signals from the second selection transistor, and to convert voltage differences between the first pixel signals and the second pixel signals into digital coefficients;

a third switch connected between the first data signal line and the first converter input;

a fourth switch connected between the second data signal line and the second converter input;

a fifth switch connected between the first data signal line and the second converter input; and a sixth switch connected between the second data signal line and the first converter input.

* * * * *